(12) United States Patent
Sugimura et al.

(10) Patent No.: US 10,706,571 B2
(45) Date of Patent: Jul. 7, 2020

(54) IMAGING DEVICE, IMAGE PROCESSING DEVICE, STORAGE MEDIUM, AND IMAGING SYSTEM

(71) Applicant: NIKON CORPORATION, Tokyo (JP)

(72) Inventors: Takeaki Sugimura, Tokyo (JP); Yoshihiro Nakagawa, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/125,465

(22) Filed: Sep. 7, 2018

(65) Prior Publication Data

US 2019/0005668 A1 Jan. 3, 2019

Related U.S. Application Data

(63) Continuation of application No. PCT/JP2017/008164, filed on Mar. 1, 2017.

(30) Foreign Application Priority Data

Mar. 9, 2016 (JP) .................... 2016-045828

(51) Int. Cl.
*H04N 7/18* (2006.01)
*G06T 7/55* (2017.01)
(Continued)

(52) U.S. Cl.
CPC ............ *G06T 7/55* (2017.01); *G06K 9/20* (2013.01); *G06K 9/6267* (2013.01); *G06T 7/40* (2013.01);
(Continued)

(58) Field of Classification Search
CPC ....... B60Q 1/0023; B60Q 1/26; G01S 17/026; G01S 17/10; G01S 17/42; G06K 9/4671;
(Continued)

(56) References Cited

U.S. PATENT DOCUMENTS

| 2013/0108116 A1* | 5/2013 | Suzuki | G01B 11/002 382/106 |
| 2013/0162643 A1* | 6/2013 | Cardle | G06T 17/00 345/420 |

(Continued)

FOREIGN PATENT DOCUMENTS

| JP | 2007-271408 A | 10/2007 |
| JP | 2010-134546 A | 6/2010 |

(Continued)

OTHER PUBLICATIONS

May 9, 2017 International Search Report issued in International Patent Application No. PCT/JP20171008164.
May 9, 2017 Written Opinion issued in International Patent Application No. PCT/JP2017/008164.
Nov. 12, 2019 Office Action issued in Japanese Patent Application No. 2018-504410.
(Continued)

*Primary Examiner* — Gims S Philippe
(74) *Attorney, Agent, or Firm* — Oliff PLC

(57) ABSTRACT

To easily process model information or information from which the model information is generated, provided is an imaging device including: an imager that images an object from a predetermined viewpoint; a distance measurer that measures distances from the predetermined viewpoint to points on the object; an object data generator that uses an image taken by the imager and measurement results of the distance measurer to generate object data in which unit data including pairs each having a pixel value in the taken image and a distance from a point on the object corresponding to the pixel value to the predetermined viewpoint is arranged in a first arrangement order; and a point cloud data generator that calculates positional information on points on the object based on the object data and arranges point data including the positional information in the first arrangement order to generate point cloud data.

30 Claims, 26 Drawing Sheets

(51) Int. Cl.
*G06T 7/73* (2017.01)
*G06K 9/62* (2006.01)
*G06T 17/20* (2006.01)
*G06T 15/04* (2011.01)
*H04N 5/247* (2006.01)
*G06T 7/40* (2017.01)
*G06K 9/20* (2006.01)
*H04N 9/04* (2006.01)

(52) U.S. Cl.
CPC ............... *G06T 7/73* (2017.01); *G06T 15/04* (2013.01); *G06T 17/20* (2013.01); *H04N 5/247* (2013.01); *G06T 2200/08* (2013.01); *G06T 2207/10024* (2013.01); *G06T 2207/10028* (2013.01); *H04N 9/0451* (2018.08)

(58) Field of Classification Search
CPC ............... G06K 9/00208; G06K 9/78; G06T 2207/10028; G06T 2207/10024; G06T 7/75; G06T 17/20
See application file for complete search history.

(56) References Cited

U.S. PATENT DOCUMENTS

| | | | | |
|---|---|---|---|---|
| 2013/0176305 | A1* | 7/2013 | Ito | G06T 17/00 345/420 |
| 2014/0037194 | A1* | 2/2014 | Kitamura | G01B 11/24 382/154 |
| 2015/0381968 | A1* | 12/2015 | Arora | G06T 17/00 348/47 |
| 2016/0139674 | A1* | 5/2016 | Watanabe | G06F 3/017 345/156 |
| 2016/0275686 | A1* | 9/2016 | Zach | G06K 9/52 |

FOREIGN PATENT DOCUMENTS

| | | |
|---|---|---|
| JP | 2013-196355 A | 9/2013 |
| JP | 2015-125685 A | 7/2015 |

OTHER PUBLICATIONS

Feb. 25, 2020 Decision of Refusal issued in Japanese Patent Application No. 2018-504410.

* cited by examiner

IMAGING DEVICE, IMAGE PROCESSING DEVICE, STORAGE MEDIUM, AND IMAGING SYSTEM

CROSS REFERENCE TO RELATED APPLICATION

This is a Continuation of PCT Application No. PCT/JP2017/008164, filed on Mar. 1, 2017. The contents of the above-mentioned application are incorporated herein by reference.

FIELD OF THE INVENTION

The present invention relates to an imaging device, an image processing device, a storage medium, and an imaging system.

BACKGROUND

A device that processes model information (three-dimensional structure information) in which the three-dimensional shape of an object is described with surface models has been proposed (see, for example, [Patent Literature 1] Japanese Unexamined Patent Application Publication No. 2010-134546).

CITATION LIST

Patent Literature

[Patent Literature 1] Japanese Unexamined Patent Application Publication No. 2010-134546

It is desired that the above-mentioned model information or information from which the model information is generated be easily processed.

SUMMARY

A first aspect of the present invention provides an imaging device including: an imager that images an object from a predetermined viewpoint; a distance measurer that measures distances from the predetermined viewpoint to points on the object; an object data generator that uses an image taken by the imager and measurement results of the distance measurer to generate object data in which unit data including pairs each having a pixel value in the taken image and a distance from a point on the object corresponding to the pixel value to the predetermined viewpoint is arranged in a first arrangement order; and a point cloud data generator that calculates positional information on points on the object based on the object data and arranges point data including the positional information in the first arrangement order to generate point cloud data.

A second aspect of the present invention provides an image processing device including: an object data generator that uses an image of an object taken from a predetermined viewpoint and measurement results of distances from the predetermined viewpoint to points on the object to generate object data in which unit data including pairs each having a pixel value in the taken image and a distance from a point on the object corresponding to the pixel value to the predetermined viewpoint is arranged in a first arrangement order; and a point cloud data generator that calculates positional information on points on the object based on the object data and arranges point data including the positional information in the first arrangement order to generate point cloud data.

A third aspect of the present invention provides a storage medium storing therein an image processing program for causing a computer to execute: generating object data by using an image of an object taken from a predetermined viewpoint and measurement results of distances from the predetermined viewpoint to points on the object, in the object data, unit data including pairs each having a pixel value in the taken image and a distance from a point on the object corresponding to the pixel value to the predetermined viewpoint being arranged in a first arrangement order; and generating point cloud data by calculating positional information on points on the object based on the object data and arranging point data including the positional information in the first arrangement order.

A fourth aspect of the present invention provides a storage medium storing therein a data structure generated by using an image of an object taken from a predetermined viewpoint and measurement results of distances from the predetermined viewpoint to points on the object to generate object data in which unit data including pairs each having a pixel value in the taken image and a distance from a point on the object corresponding to the pixel value to the predetermined viewpoint is arranged in a first arrangement order. The data structure includes: setting information in which the first arrangement order is defined; and point data that includes positional information on points on the object calculated based on the object data and that is arranged in the first arrangement order.

A fifth aspect of the present invention provides an imaging device including: an imager that images an object from particular positions; a distance measurer that measures distances from the particular positions to the object; an object data generator that uses an image taken by the imager and measurement results of the distance measurer to generate object data in which unit data including pairs each having a pixel value in the taken image and the distance corresponding to the pixel value is arranged in a first arrangement order; and a point cloud data generator that arranges point data including positional information on points on the object based on the object data in the first arrangement order to generate point cloud data.

A sixth aspect of the present invention provides an imaging system including: a first imager that images an object from a particular position; a first distance measurer that measures a distance from the particular position to the object; a first object data generator that uses an image taken by the first imager and a measurement result of the first distance measurer to generate first object data in which unit data including pairs each having a pixel value in the taken image and the distance corresponding to the pixel value is arranged in a first arrangement order; a first point cloud data generator that arranges point data including positional information on points on the object based on the first object data in the first arrangement order to generate first point cloud data; a second imager that images the object from a position different from the particular position; a second object data generator that generates second object data in which unit data including pairs each having an image taken by the second imager and a distance from the different position to the object is arranged in a second arrangement order; a second point cloud data generator that arranges point data including positional information on points on the object based on the second object data in the second arrangement order to generate second point cloud data; and a model integrator that integrates first model information based on the first point cloud data and second model information based on the second point cloud data.

A seventh aspect of the present invention provides an imaging system including: the imaging device in the first aspect or the fifth aspect; and an information processing device that processes information output from the imaging device.

DETAILED DESCRIPTION OF EMBODIMENTS

First Embodiment

Figure 1A:
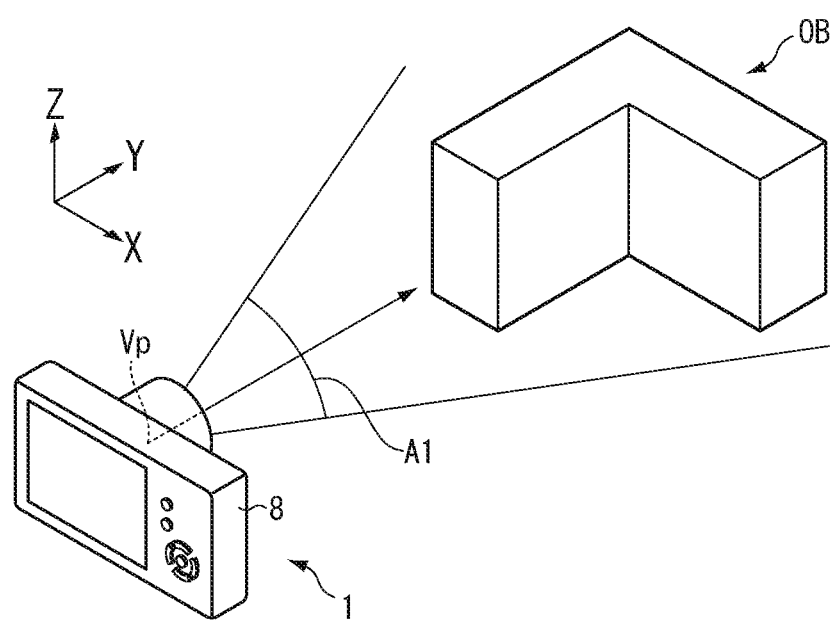
FIGS. 1A and 1B are include diagrams illustrating an imaging device according to a first embodiment.

A first embodiment is described. FIG. 1A is a diagram illustrating an example of an imaging device 1 according to the first embodiment. The imaging device 1 is an imaging device that detects an object OB from a predetermined viewpoint (one viewpoint, single viewpoint, a plurality of viewpoints), and detects an object OB in a detection region A1 (for example, field of view). For example, the imaging device 1 may be a fixed-point camera, a camera capable of manually or automatically changing the field of view, or a portable information terminal (for example, smartphone, tablet, and mobile phone with camera).

The imaging device 1 uses the result of detecting the object OB to perform arithmetic processing for information on the object OB. The imaging device 1 performs the arithmetic processing to model at least a part of the object OB and calculate model information (model data, CG model data). For example, the imaging device 1 uses the detection result of the object OB (for example, taken image, depth information) to perform processing for generating or extracting at least one of shape information and texture information (surface information). For example, the above-mentioned arithmetic processing may include computer graphic processing (CG processing) for at least a part of the object OB.

For example, the model information includes at least one of shape information representing the three-dimensional shape of the object OB and texture information representing design of the surface of the object OB. For example, the model information includes at least one of three-dimensional point coordinates, relevance information on the point coordinates, texture information on surfaces defined by point coordinates and their relevance information, spatial information on images, such as illumination conditions and light source information in the entire image, and polygon data serving as shape information. For example, the texture information includes at least one information on a character, a figure, a pattern, information defining unevenness, a particular image, and color (for example, chromatic color, achromatic color) on the surface of the object OB. For example, the imaging device 1 calculates model information representing the object OB viewed from a predetermined viewpoint Vp (for example, one viewpoint, single viewpoint, and one direction).

Figure 1B:
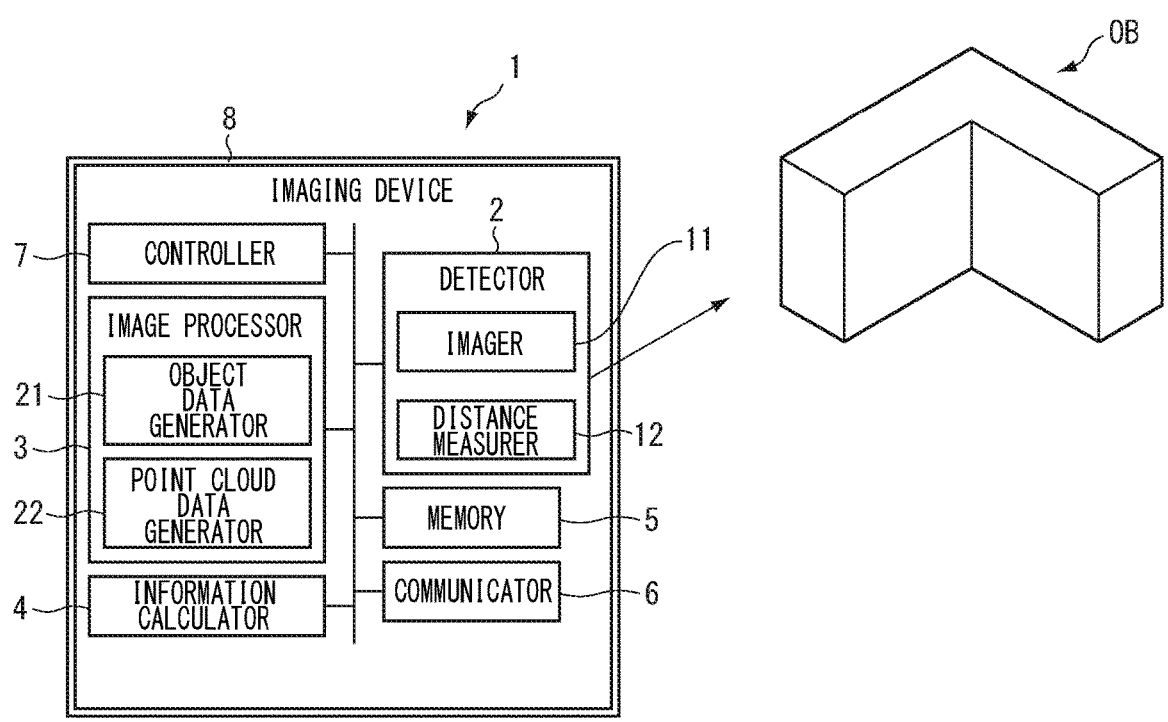

FIG. 1B is a block diagram illustrating an example of the configuration of the imaging device 1. For example, the imaging device 1 includes a detector 2, an image processor 3 (image processing device), an information calculator 4, a memory 5, a communicator 6 (transmitter), a controller 7, and a main body 8. Examples of the main body 8 include a camera body, a case, and a casing. For example, the detector 2, the image processor 3, and the information calculator 4 are provided in the main body 8.

Figure 2:
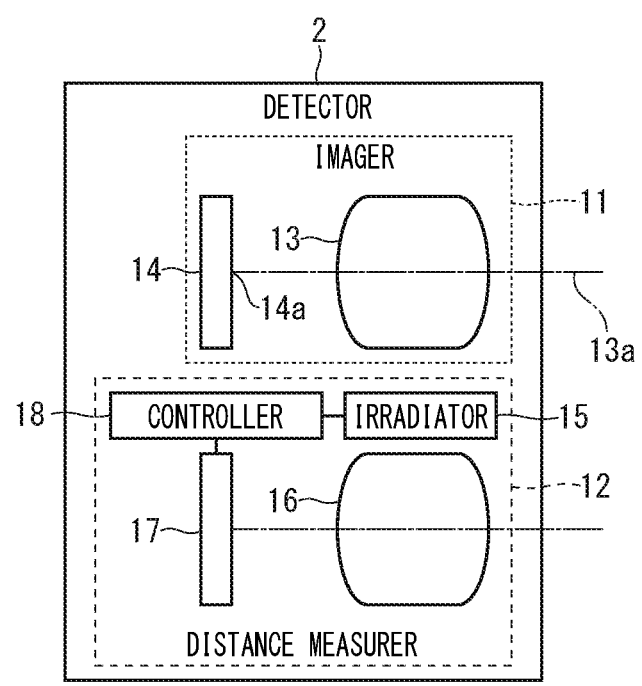
FIG. 2 is a diagram illustrating a detector according to the first embodiment.

FIG. 2 is a diagram illustrating an example of the detector 2. The detector 2 optically detects an object OB from a predetermined viewpoint Vp. For example, the detector 2 acquires at least one of an image of the object OB viewed from a predetermined one viewpoint and a distance from the predetermined one viewpoint to each point on the object OB. For example, the detector 2 may detect the object OB from a predetermined angle of sight. For example, the detector 2 may detect the object OB from a predetermined line of sight (for example, single line of sight). The detector 2 includes an imager 11 and a distance measurer 12. The imager 11 images the object OB from the predetermined viewpoint Vp. The distance measurer 12 detects the distance from the predetermined viewpoint Vp (see FIG. 1A) to each point on the object OB.

The imager 11 includes an image forming optical system and an imaging element (detection element, light receiving element) 14. The image forming optical system 13 forms an image of the object OB on the imaging element 14 (projects an image of the object OB to the imaging element 14). For example, the image forming optical system 13 is held in a lens barrel and mounted to the main body 8 (see FIG. 1A and FIG. 1B) together with the lens barrel. Examples of the image forming optical system 13 and the lens barrel include an interchangeable lens, which is detachable from the main body 8. The image forming optical system 13 and the lens barrel may be a built-in lens, and, for example, the lens barrel may be a part of the main body 8 and may be undetachable from the main body 8.

For example, the imaging element 14 is a CMOS image sensor or a CCD image sensor in which a plurality of pixels are two-dimensionally arranged. For example, the imaging element 14 is housed in the main body 8. The imaging element 14 takes an image formed by the image forming optical system 13. For example, imaging results (detection results) of the imaging element 14 include information (for example, RGB data) on pixel value (for example, gray-scale values) of colors of pixels. For example, the imaging element 14 outputs the imaging results in a data format of a full-color image.

Figure 3A:
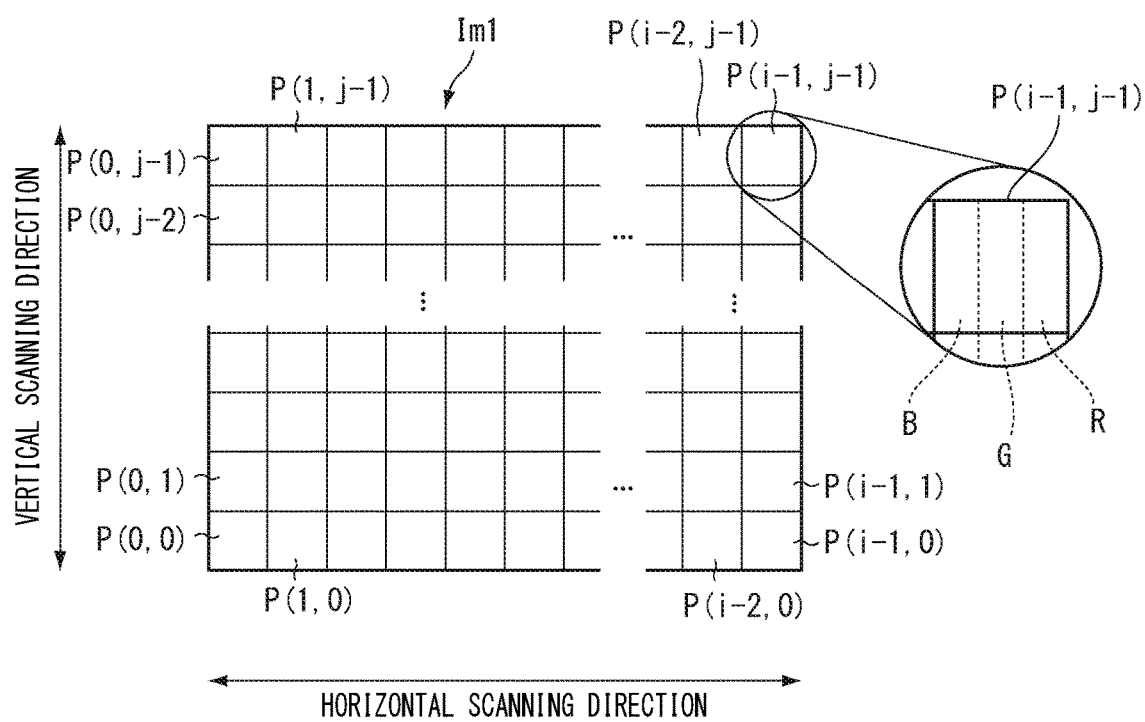
FIGS. 3A and 3B include diagrams illustrating a taken image and image data by an imager according to the first embodiment.
Figure 3B:
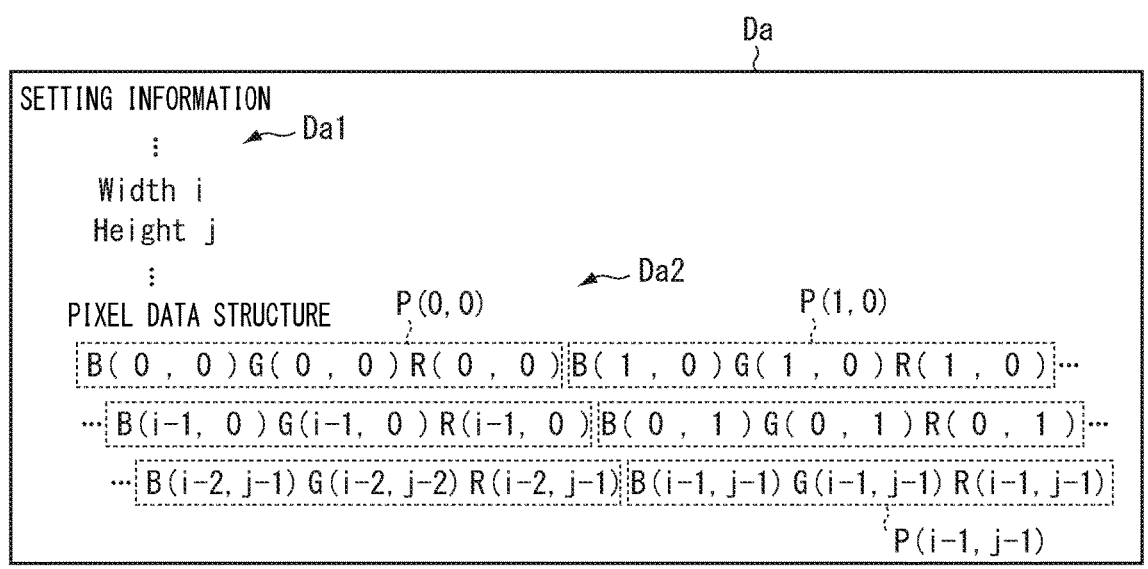

FIG. 3A is a conceptual diagram illustrating an image Im1 taken by the imager 11 according to the embodiment, and FIG. 3B is a diagram illustrating a data structure of image data Da. In the taken image Im1, a plurality of pixels P are two-dimensionally arranged. A first direction in which pixels are arranged is referred to as "horizontal scanning direction", and a second direction (direction different from first direction) in which pixels are arranged is referred to as "vertical scanning direction". The positions of pixels in the horizontal scanning direction are referred to as "0, 1, 2, ... , i−1", and the positions of pixels in the vertical scanning direction are referred to as "0, 1, 2, ... , j−1". i is the number of pixels arranged in the horizontal scanning direction, and j is the number of pixels arranged in the vertical scanning direction. For example, i is 640 and j is 480 when the resolution is VGA. The resolution is freely set, and may be, for example, a full HD (Full High Definition, number of pixels is 1920×1080) or another resolution. A pixel P whose position in the horizontal scanning direction is x (x is an integer of 0 or more and i−1 or less) and position in the vertical scanning direction is y (y is an integer of 0 or more and j−1 or less) is represented by symbol P(x,y). Pixels arranged in the horizontal scanning direction are referred to as "row", and pixels arranged in the vertical scanning direction are referred to as "column".

For example, the taken image Im1 is capable of representing colors by additive color mixing. Each pixel (for example, pixel P(i−1,j−1)) includes subpixels (R, G, B) representing different colors. In the following, a pixel value (gray-scale value) of B (blue) in a pixel P(x,y) is represented by B(x,y), a pixel value (gray-scale value) of G (green) in the pixel P(x,y) is represented by G(x,y), and a pixel value (gray-scale value) of R (red) in the pixel P(x,y) is represented by R(x,y). For example, B(x,y), G(x,y), and R(x,y) are each represented by 8-bit digital data. For example, pixel data on P(0,0) is represented by a set of B(0,0), G(0,0), and R(0,0). For example, B(x,y), G(x,y), and R(x,y) are each digital data (fixed-length data) having a desired number of bits set in advance.

In the taken image Im1, the number of kinds of colors used for additive color mixing is freely selected, and may be two or four or more. The taken image Im1 may use a color system other than the RGB color system, and, for example, may represent colors by an XYZ color system. The taken image Im1 is not necessarily required to be a color image, and may be a gray-scale image. When the taken image Im1 is a gray-scale image, the taken image Im1 includes pixel values that represent brightness from black to white in a stepwise manner instead of pixel values of blue, green, and red.

As illustrated in FIG. 3B, the image data Da includes setting information Da1 and a pixel data structure Da2. For example, the setting information Da1 is header information, and is read first in the image data Da when the image data Da is read to an image processing device or the like. For example, the setting information Da1 includes a file header, an information header, and a pallet header. The file header stores therein information on the file itself, such as the file type and the file size. The information header stores therein information necessary for data to be treated as an image. For example, the information header includes arrangement information ("Width" and "Height" in FIG. 3B) representing the size of the arrangement of pixels. "Width" is the width of the image (number of pixels arranged in horizontal scanning direction), and is i in the example in FIG. 3A. "Height" is the height of the image (number of pixels arranged in vertical scanning direction), and is j in the example in FIG. 3A. The pallet header stores therein index colors of pixel data stored in the pixel data structure Da2.

The pixel data structure Da2 stores therein pixel values of colors of a plurality of pixels. For example, the pixel data structure Da2 is a structure in which pixel values of B, G, and R are successively arranged in a predetermined order in pixel data for each pixel and pieces of pixel data are repeatedly arranged in the arrangement order of the pixels. For example, the first pixel data in the pixel data structure Da2 is pixel data on a pixel P(0,0), and the pieces of pixel data on pixels P(1,0), . . . , and P(i−1,0) are arranged in the arrangement order in the horizontal scanning direction. Next to pixel data on the last pixel P(i−1,0) in the horizontal scanning direction, pixel data on a pixel P(0,1) that is obtained by incrementing (+1) the position in the vertical scanning direction to serve as a starting point in the horizontal scanning direction is disposed. Similarly, pixel data up to the pixel P(i−1,j−1) are sequentially arranged. In the pixel data structure Da2, (i×j) pieces of pixel data (set of pixel values of B, G, and R) are arranged.

For example, the pixel data structure Da2 is read by the image processor 3 by a predetermined access method (for example, sequential access). In the case of sequential access, for example, the pixel data structure Da2 is read such that processing is repeated for sequentially reading pixel data in one row in the horizontal scanning direction from pixel data on a pixel at the lower left end of the image and next reading pixel data on pixels in the next row that is stepped in the vertical scanning direction by one pixel, whereby pixel data on all pixels are read. A device that reads the image data Da (for example, image processor 3) is capable of acquiring information on the size of the arrangement of pixels from the setting information Da1, and determining at which pixel position the pixel data is based on the order in which the pixel data is read from the pixel data structure Da2 (reading order, access order). The pixel data structure Da2 may be read by random access, and in this case, a device that reads the image data Da is capable of calculating addresses of pixel data by using positions of pixels to directly read the pixel data.

In images such as bitmap, "Width" or "Height" may be represented by a negative value, and the start point of the arrangement is determined depending on whether "Width" or "Height" is positive or negative. For example, when "Height" is positive, it represents that the arrangement (bottom-up method) ascends from a pixel at the lower left in the image as a starting point, and when "Height" is negative, it represents that the arrangement descends (top-down method) from a pixel at the upper left as a starting point. In this manner, in the taken image Im1, the direction of the arrangement may be represented depending on whether "Width" or "Height" is positive or negative, and the direction of the arrangement may be represented by other methods such as flags.

Referring back to FIG. 2, the distance measurer 12 detects a distance from each point on the surface of the object OB. For example, the distance measurer 12 detects the distance by a time of flight (TOF) method. The distance measurer 12 may detect the distance by another method. For example, the distance measurer 12 may include a laser scanner and detect the distance by laser scanning. For example, the distance measurer 12 may project a predetermined pattern to the object OB and measure the distance based on a result of detecting the pattern. The distance measurer 12 may include a phase difference sensor and detect the distance by the phase difference method. The distance measurer 12 may detect the distance by a depth from defocus (DFD) method or a triangulation method using a plurality of imaging elements (for example, stereoscopic cameras). In the case where the DFD method or the triangulation method is used, the distance measurer 12 may use at least one of the image forming optical system 13 and the imaging element 14 in the imager 11.

For example, the distance measurer 12 includes an irradiator 15, an image forming optical system 16, an imaging element 17, and a controller 18. The irradiator 15 is able to irradiate the object OB with infrared light. The irradiator 15 is controlled by the controller 18. The controller 18 temporally changes (for example, amplitude modulates) the intensity of infrared light applied from the irradiator 15. The image forming optical system 16 forms an image of the object OB. The image forming optical system 16, similarly to the image forming optical system 13, may be at least a part of interchangeable lenses or at least a part of built-in lenses. The imaging element 17 is, for example, a CMOS image sensor or a CCD image sensor. The imaging element 17 has sensitivity to at least a wavelength band of light applied by the irradiator 15. The imaging element 17 is, for example, controlled by the controller 18 to detect infrared light reflected and scattered by the object OB. For example, the imaging element 17 takes the image formed by the image forming optical system 16.

The controller 18 uses the detection results of the imaging element 17 to detect distances (depths) from points on the surface of the object OB to the imaging element 17. For example, flying time of light entering the imaging element 17 from a point on the surface of the object OB changes depending on the depth of the point. The output of the imaging element 17 changes depending on the flying time, and, for example, the controller 18 calculates the depth based on the output of the imaging element 17. For example, the controller 18 calculates the depth for each partial region (for example, one pixel, pixels) of an image taken by the imaging element 17, and calculates (generates) depth information by associating the position and the depth in the region. For example, the depth information includes information in which the position of a point on the surface of the object OB and the distance (depth) from the point to the imaging device 1 are associated with each other. For example, the depth information includes information (for example, a depth image) representing a distribution of depths (for example, depth map) in the object OB. For example, the depth image is a gray-scale image in which the distances from positions on the object OB corresponding to pixels to the predetermined viewpoint Vp are represented by gradation.

Figure 4A:
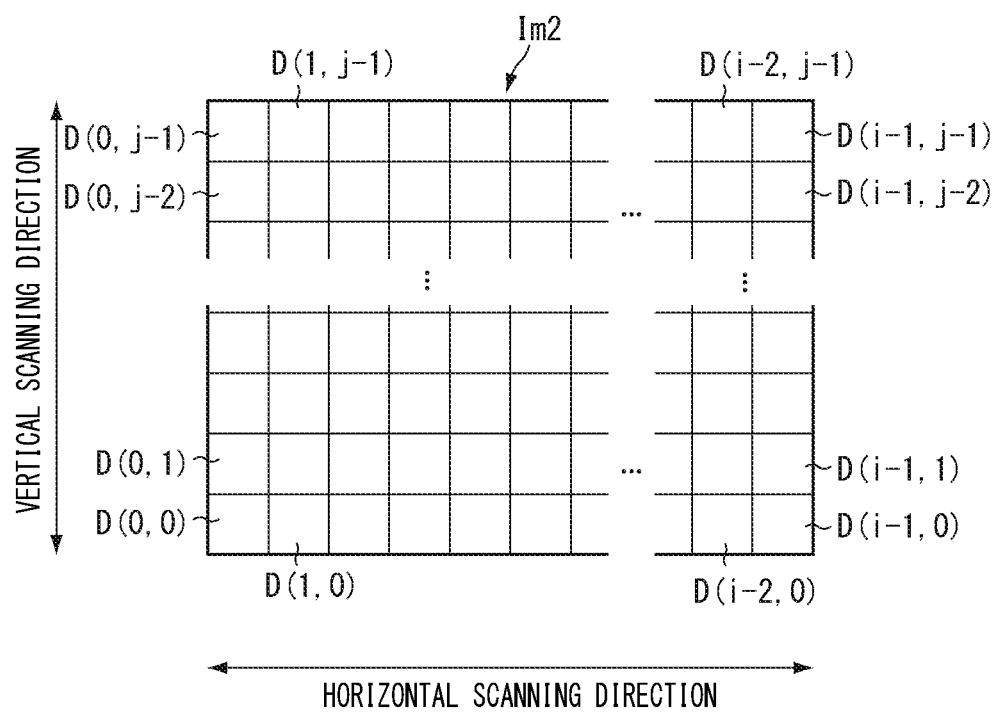
FIGS. 4A and 4B include diagrams illustrating a depth image and depth information by a distance measurer according to the first embodiment.
Figure 4B:
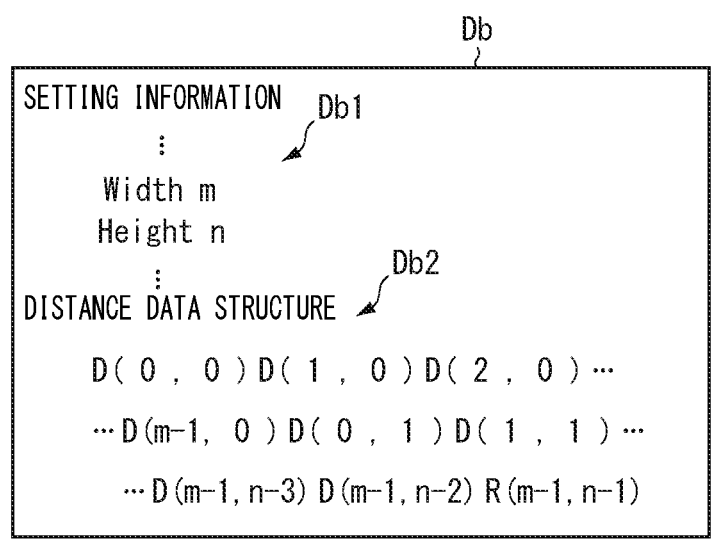

FIG. 4A is a conceptual diagram illustrating a depth image Im2 by the distance measurer 12 according to the embodiment, and FIG. 4B is a diagram illustrating a data structure of image data (depth information) on the depth image Im2. In the depth image Im2, a plurality of pixels D are two-dimensionally arranged. A pixel representing a distance (depth) between a point (part) on the object OB corresponding to a pixel P(x,y) and a predetermined viewpoint Vp is represented by symbol D(x,y). In the depth image Im2, descriptions common to the taken image Im1 in FIG. 3A are omitted or simplified as appropriate. m is the number of pixels arranged in the horizontal scanning direction, and n is the number of pixels arranged in the vertical scanning direction. For example, the pixel value of each pixel in the depth image Im2 represents the distance between a point on the object OB corresponding to each pixel and the predetermined viewpoint Vp by a gray-scale value. For example, the pixel value of each pixel in the depth image Im2 is digital data (fixed-length data) having a desired number of bits set in advance.

As illustrated in FIG. 4B, image data Db (depth information) on the depth image Im2 includes setting information Db1 and a distance data structure Db2. For example, the setting information Db1 is header information, and is read first in the image data Da when the image data Db is read to an image processing device, a display device, or the like. For example, the setting information Db1 includes arrangement information ("Width" and "Height" in FIG. 4B) representing the arrangement of pixels. "Width" is the width of an image (number of pixels arranged in horizontal scanning direction), and is m in the example in FIG. 4A. "Height" is the height of the image (number of pixels arranged in vertical scanning direction), and is n in the example in FIG. 4A. The following description assumes that m=i and n=j, but m may be a value different from i and n may be a value different from j.

The distance data structure Db2 stores therein pixel values of each pixel. For example, the distance data structure Db2 is a structure in which the pixel values are repeatedly arranged in the arrangement order of pixels D. For example, the first pixel value in the distance data structure Db2 is a pixel value of a pixel D(0,0), and similarly, pixel values of pixels D(1,0), . . . , and D(m−1,0) are arranged in the arrangement order in the horizontal scanning direction. Next to a pixel value of the last pixel D(m−1,0) in the horizontal scanning direction, a pixel value of a pixel D(0,1) that is obtained by incrementing (+1) the position in the vertical scanning direction to serve as a starting point in the horizontal scanning direction is disposed. Similarly, pixel values up to the pixel D(i−1,j−1) are sequentially arranged. In the distance data structure Db2, (m×n) pixel values are serially arranged.

For example, the distance data structure Db2 is read by the image processor 3 by sequential access in the arrangement order. For example, the distance data structure Db2 is read such that processing is repeated for sequentially reading pixel values of pixels in one row in the horizontal scanning direction from a pixel at the lower left end of the image and next sequentially reading pixel values of pixels in the next row that is stepped in the vertical scanning direction by one pixel, whereby pixel values of all pixels are read. A device that uses the image data Db is capable of acquiring arrangement information (for example, m, n) on pixels from the setting information Db1 and associating the positions of the pixels with pixel values based on the order in which the pixel values are read from the distance data structure Db2. For example, the distance data structure Db2 may be read by random access similarly to the pixel data structure Da2.

Referring back to FIG. 1, the image processor 3 (image processing device) includes an object data generator 21 and a point cloud data generator 22. The object data generator 21 generates object data Dc (described later with reference to FIG. 5A) by using images taken by the imager 11 and measurement results of the distance measurer 12. The point cloud data generator 22 calculates positional information (for example, coordinates) of a point on the object OB based on the object data Dc. The point cloud data generator 22 arranges point data F including at least positional information on points on the object OB to generate point cloud data De (described later with reference to FIG. 5B and FIG. 5C).

For example, the point data F includes coordinates (X,Y,Z) of points on the object OB acquired from the detection results of the detector 2. For example, the pieces of point data F each include three-dimensional coordinates of a point on the surface of the object OB estimated by the image processor 3 using the detection result of the detector 2.

For example, the point cloud data generator 22 calculates, as shape information, point cloud data including coordinates of a plurality of points on the object OB based on the detection results of the detector 2. The point cloud data generator 22 uses the detection results of the distance measurer 12 (for example, depth information) to calculate point cloud data (point cloud data processing). For example, the point cloud data generator 22 calculates point cloud data by perspective transformation from a distance image (depth image) represented by the depth information to a planar image. When the imager 11 and the distance measurer 12 have different fields of view, for example, the point cloud data generator 22 may convert the detection results of the distance measurer 12 into the result of detecting the object OB from the field of view of the imager 11 by perspective transformation (projection transformation). For example, the point cloud data generator 22 may execute perspective transformation by using parameters that depend on the positional relation between the field of view of the imager 11 and the field of view of the distance measurer 12 (for example, position of viewpoint, direction of line of sight).

Figure 5A:
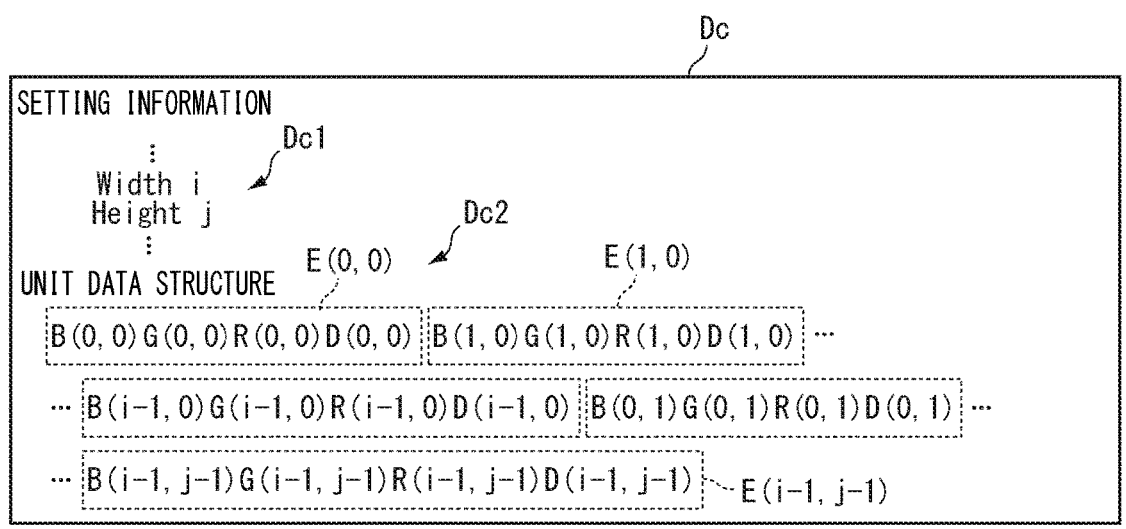
FIGS. 5A to 5C include diagrams illustrating object data and point cloud data according to the first embodiment.

FIG. 5A is a conceptual diagram illustrating an example of the object data Dc according to the first embodiment. For example, the object data Dc is image data on an RBG-D image. The object data Dc includes setting information Dc1 and a unit data structure Dc2. For example, the setting information Dc1 is header information, and is read first in the object data Dc when the object data Dc is read to an image processing device or the like. The setting information Dc1 includes information representing the structure of the unit data structure Dc2. For example, the setting information Dc1 includes information ("Width" and "Height" in FIG. 5A) representing the arrangement of pixels in the RBG-D image. "Width" is the width of the image (the number of pixels arranged in the horizontal scanning direction), and is i in the example in FIG. 5A. "Height" is the height of the image (the number of pixels arranged in the vertical scanning direction), and is j in the example in FIG. 5A.

For example, the unit data structure Dc2 is a structure obtained by extending the image data Da on the taken image Im1 from three dimensions (R,G,B) to four dimensions (R,G,B,D). For example, the unit data structure Dc2 is a structure in which a plurality of pieces of unit data E are serially arranged. The pieces of unit data E are each data in which pixel values (R,G,B in FIG. 3B) in the taken image Im1 and information (pixel values of the pixel D in FIG. 4B) on a distance from a point on the object OB corresponding to the pixel values to a predetermined viewpoint Vp are paired. Unit data E corresponding to a pixel P(x,y) is represented by symbol E(x,y). For example, unit data E(0,0) includes pixel values (B(0,0),G(0,0),R(0,0)) of a pixel P(0,0) in FIG. 3B and a depth (pixel values of the pixel D(0,0)) corresponding to a distance between the position on the object OB corresponding to the pixel P(0,0) and the predetermined viewpoint Vp.

Pixels (or pixel values) in the taken image Im1 are arranged in a first arrangement order (predetermined arrangement order, order of accesses to a plurality of pixels), and in the unit data structure Dc2, the unit data E is arranged in the first arrangement order (for example, the same order and the same pattern as the reading order of pixels or the pixel values of the pixels in the taken image Im1). For example, in the unit data structure Dc2, the unit data E is serially arranged so as to maintain the arrangement order (first arrangement order) of acquired pixels (or pixel values) in the taken image Im1. For example, in the unit data structure Dc2, unit data E(0,0) to unit data E(i−1,0) corresponding to pixels in the first row are sequentially arranged, unit data E(0,1) to unit data E(i−1,1) corresponding to pixels in the next second row are sequentially arranged, and similarly, unit data E up to unit data E(i−1,j−1) are sequentially arranged. In the unit data structure Dc2, for example, the unit data E(0,0) to the unit data E(i−1,j−1) are read by sequential access in the arrangement order, but, for example, may be read by random access similarly to the image data Da.

The object data generator 21 arranges the unit data E in the first arrangement order to generate the object data Dc. For example, the object data generator 21 maintains, in the object data Dc, the arrangement order (for example, the first arrangement order) of pixel values in data on the taken image Im1. For example, the object data generator 21 arranges the unit data E while maintaining the arrangement order (first arrangement order) of pixels in the taken image Im1 (or pixel values in data on the taken image Im1), and generates the object data Dc in which the unit data E is arranged in the maintained arrangement order. For example, the object data generator 21 arranges the unit data E in the order in which pixel data (pixel values) in the taken image Im1 is maintained (first arrangement order, data maintaining order), and generates the object data Dc in which the unit data E is arranged. For example, the object data generator 21 reads pixel data from image data Da on the taken image Im1 (see FIG. 3B) by sequential access, reads pixel values (depths) from image data Db on the depth image Im2 (see FIG. 4A) by sequential access, and arranges the pixel data in the taken image Im1 and the pixel values (depths) in the depth image in such a manner that the pixel data and the pixel values are paired in the reading order, thereby generating the object data Dc. When the resolution (i×j) of the taken image Im1 and the resolution (m×n) of the depth image Im2 are different, the object data generator 21 may match the resolutions of the taken image Im1 and the depth image Im2 by using interpolation or averaging to generate the object data Dc. For example, the object data Dc (for example, the unit data structure Dc2) is an indexless data structure. For example, in the unit data structure Dc2, pieces of unit data E are each data that does not include an index of the unit data E itself (for example, identification information, property, order in a point data structure De2). For example, the object data Dc is a data structure in which the arrangement order of the unit data E is patterned. For example, the object data Dc is a data structure in which the arrangement order of the unit data E is associated with the reading order (first arrangement order) of pixels in the taken image Im1. For example, the object data generator 21 stores the generated object data Dc in the memory 5 (see FIG. 1B). For example,
the object data generator 21 stores the above-mentioned first arrangement order in the memory 5 in order to maintain the arrangement order of the unit data or pixel values.

Figure 5B:
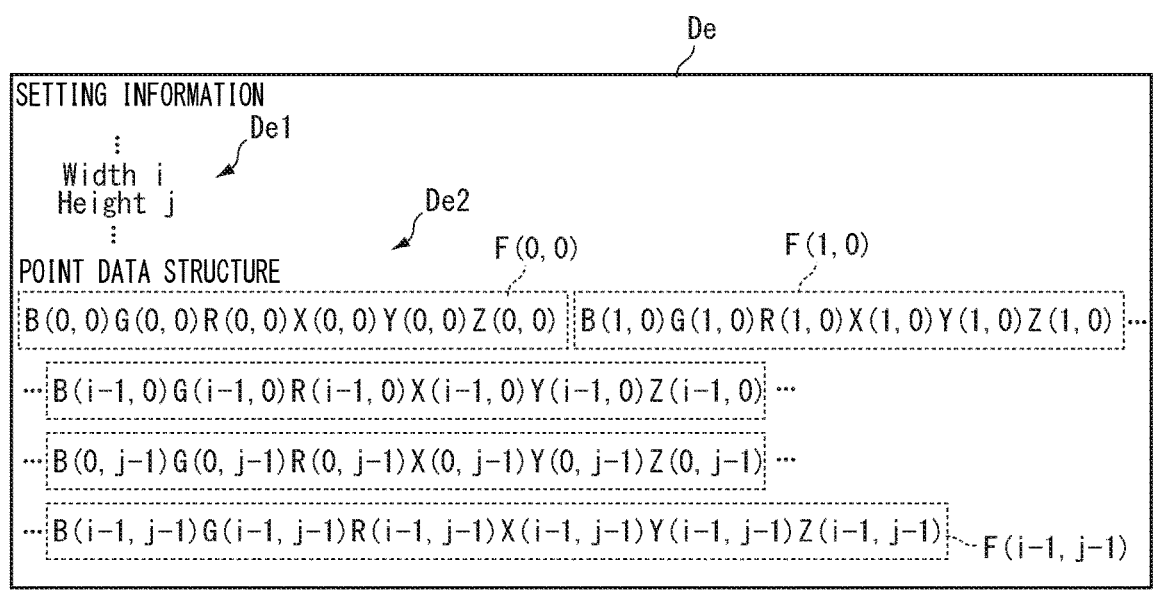

FIG. 5B is a conceptual diagram illustrating an example of point cloud data according to the first embodiment. The point cloud data De is data obtained by converting, for example, the depths of an RBG-D image into positional information (for example, coordinates). The point cloud data De includes setting information De1 and a point data structure De2. The point data structure De2 is a structure in which a plurality of pieces of point data F are serially arranged. The point data F has a structure in which pixel values (R, G, and B in FIG. 3B) in the taken image Im1 and coordinates (X, Y, and Z) of points on the object OB corresponding to the pixel values are paired. Point data corresponding to a pixel P(x,y) is represented by symbol F(x,y). Coordinates of a point on the object OB corresponding to the pixel P(x,y) in the real space are represented by a set of X(x,y), Y(x,y), and Z(x,y). For example, the point data structure De2 is a structure obtained by extending the pixel data on the taken image from three dimensions (R,G,B) to six dimensions (R,G,B,X,Y,Z).

In the point data structure De2, the point data F is arranged in the first arrangement order. For example, in the point data structure De2, the point data F is arranged so as to maintain the arrangement order of unit data E in the object data Dc (see FIG. 5A). For example, in the point data structure De2, point data F(0,0) to point data F(i−1,j−1) corresponding to unit data E(0,0) to unit data E(i−1,j−1) is arranged in this order. The order (for example, the first arrangement order) in which the point data F is arranged in the point data structure De2 may be the order in which pixels corresponding to the point data F is arranged in the taken image or may be the order in which pixel data (pixel values) corresponding to the point data F is arranged in data on the taken image. The order (for example, the first arrangement order) in which the point data F is arranged in the point data structure De2 may be the order in which depths (distances, pixel values corresponding to distances in the depth image) corresponding to the point data F is arranged in depth information (for example, the depth image). In the point data structure De2, for example, the point data F is read by sequential access in the arrangement order. The point data F may be read by random access similarly to the object data Dc.

For example, the setting information De1 is header information, and is read first in the point cloud data De when the point cloud data De is read to an image processing device or the like. The setting information De1 includes information representing the structure of the point data structure De2. For example, the setting information De1 includes arrangement information ("Width" and "Height" in FIG. 5) representing the arrangement of point data F. A device that uses the point cloud data De is capable of determining which part in the detection region A1 by the detector 2 has a correspondence relation with the point data F by using the order in which the point data F is read and the above-mentioned arrangement information. For example, when the point data F is two-dimensionally arranged corresponding to the unit data E in the object data Dc, "Width" is the number of pieces of point data F in the first direction, and is i in the example in FIG. 5A. When the point data F is two-dimensionally arranged corresponding to the unit data E in the object data Dc, "Height" is the number of pieces of point data F in the second direction, and is j in the example in FIG. 5A. For example, when i and j are given, the order in which the point data F is read is usable as information that associates a part on the detection region A1 (taken image, depth image) by the detector 2 with the point data F. For example, the order in which the point data F is read is usable as information representing the position of a part corresponding to the point data F in the detection region A1 by the detector 2.

The point cloud data generator 22 arranges the point data F in the first arrangement order held by the object data generator 21 to generate the point cloud data De. For example, the point cloud data generator 22 arranges the point data F while maintaining the arrangement order of the unit data E in the object data Dc, and generates the point cloud data De in which the point data F is arranged. For example, the point cloud data generator 22 sequentially reads the unit data E in the object data Dc by sequential access, and replaces the pixel values of pixels D(x,y) with a set of X(x,y), Y(x,y), and Z(x,y) in the order by which the unit data E is read, thereby generating point data F. The point cloud data generator 22 stores the point data F in the point data structure De2 in the order by which the unit data E corresponding to the point data F is read, thereby generating the point cloud data De. The point cloud data De (for example, the point data structure De2) is, for example, an indexless data structure. For example, in the point data structure De2, pieces of the point data F are each data that does not include an index of the point data F itself (for example, identification information, property, order in the point data structure De2). For example, the point cloud data De is a data structure in which the arrangement order of the point data F is patterned. For example, the point cloud data De is a data structure in which the arrangement order of the point data F is associated with the reading order of the unit data E in the object data Dc (reading order of pixels in the taken image Im1). For example, the point cloud data generator 22 stores the generated point cloud data De in the memory 5 (see FIG. 1B).

Figure 5C:
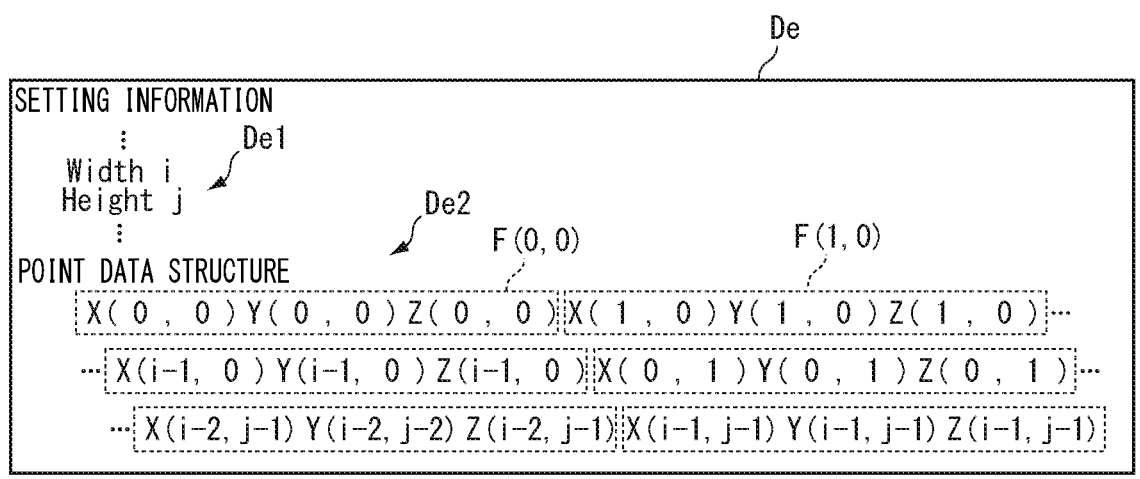

FIG. 5C is a conceptual diagram illustrating another example of point cloud data according to the first embodiment. The point cloud data De has a structure obtained by removing pixel values (R, G, B) from the point cloud data De in FIG. 5B. For example, the object data generator 21 sequentially reads unit data E in the object data Dc by sequential access, converts pixel values of pixels D(x,y) into positional information (X, Y, Z) to generate point data F, and stores point data F(x,y) in the point data structure De2 in the order by which the pixel values of the pixel D(x,y) are read, thereby generating the point cloud data De. In this manner, the point data F is not necessarily required to include pixel values (R, G, B). The point data F may include information other than pixel values and positional information.

In the above-mentioned point cloud data De, for example, information (for example, i,j) representing the structure in the point data structure De2 can be used as information representing a relative relation of parts corresponding to the point data F in information (for example, the taken image and the depth image) from which the point data F has been generated. For example, the point cloud data De according to the embodiment maintains the positional relation in the detection region A1 by the detector 2 by the information representing the structure in the point data structure De2 and the arrangement order (first arrangement order) of the point data. For example, when x is an integer of 1 or more and (i−1) or less, point data F(x−1,y) and point data F(x+1,y) are parts adjacent to a part corresponding to point data F(x,y) in a first direction (for example, the horizontal scanning direction) in the detection region A1 (for example, a field of view) by the detector 2. For example, the point data F(x−1,y), which is read immediately before the point data F(x,y), and the point data F(x+1,y), which is read immediately after the point data F(x,y), are parts adjacent to the part corresponding to the point data F(x,y) in the first direction (for example, the horizontal scanning direction) in the detection region A1 by the detector 2.

For example, when y is an integer of 1 or more and (i−1) or less, point data F(x,y−1) and point data F(x,y+1) are parts adjacent to a part corresponding to point data F(x,y) in a second direction (for example, the vertical scanning direction) in the detection region A1 by the detector 2. For example, the point data F(x,y−1), which is read before the point data F(x,y) by (i−1) piece of point data, and the point data F(x,y+1), which is read after the point data F(x,y) by (i−1) piece of point data, are parts adjacent to the part corresponding to the point data F(x,y) in the second direction (for example, the vertical scanning direction) in the detection region A1 by the detector 2. For example, such point cloud data De is easily processed when generating information on a line connecting two points on the object OB or information (mesh information, surface information) on a surface surrounded by three or more lines on the object OB.

Figure 6A:
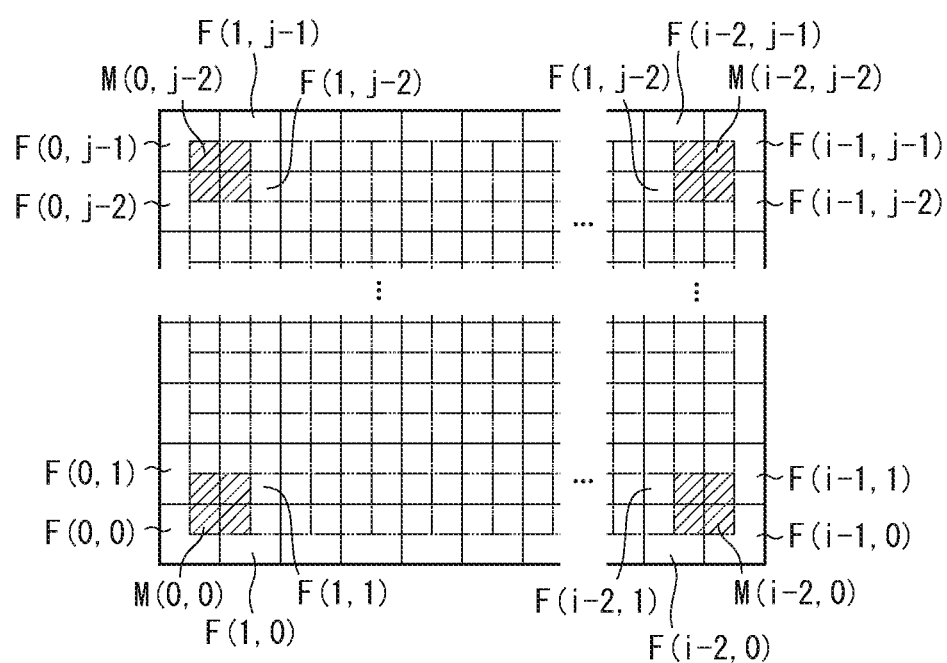
FIGS. 6A and 6B include diagrams illustrating examples of mesh information according to the first embodiment.

FIG. 6A is a conceptual diagram illustrating an example of meshes according to the first embodiment. In FIG. 6A, the point data F in the point cloud data De is conceptually illustrated in such a manner that the point data F is two-dimensionally arranged corresponding to the object data Dc. In FIG. 6A, meshes M are surfaces having four pieces of point data F as vertices. A mesh M surrounded by a line connecting point data F(x,y) and point data F(x+dx,y), a line connecting the point data F(x+dx,y) and point data F(x+dx,y+dy), a line connecting the point data F(x+dx,y+dy) and point data F(x,y+dy), and a line connecting the point data F(x,y+dy) and the point data F(x,y) is represented by symbol M(x,y). dx and dy are information representing the arrangement of the point data F in the mesh M. dx and dy are each an integer of 1 or more, and in FIG. 6A, dx=1 and dy=1. dy may be a value different from dx, and at least one of dx and dy may be an integer of 2 or more. In FIG. 6A, four meshes M(0,0), mesh M(i−2,0), mesh M(0,j−2), and mesh M(i−2, j−2) are representatively illustrated by hatching, but meshes M may be defined in other areas.

Figure 6B:
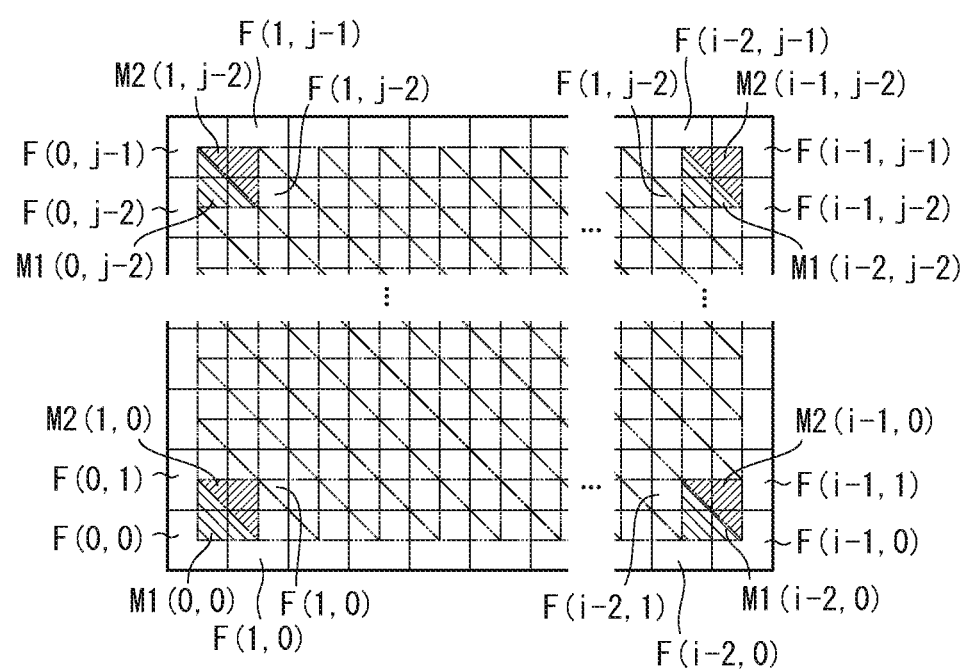

FIG. 6B is a conceptual diagram illustrating another example of meshes according to the first embodiment. In FIG. 6B, meshes M are surfaces having three pieces of point data F as vertices. A mesh M surrounded by a line connecting point data F(x,y) and point data F(x+dx,y), a line connecting the point data F(x+dx,y) and point data F(x,y+dy), and a line connecting the point data F(x,y+dy) and the point data F(x,y) is represented by symbol M1($x,y$). A mesh M surrounded by a line connecting point data F(x+dx,y) and point data F(x+dx,y+dy), a line connecting the point data F(x+dx,y+dy) and point data F(x,y+dy), and a line connecting the point data F(x,y+dy) and the point data F(x+dx,y) is represented by symbol M2($x$+dx,y).

The number of vertices of the mesh M may be three as illustrated in FIG. 6B, may be four as illustrated in FIG. 6A, and may be any number of five or more. While the information on the surface surrounded by three or more lines on the object OB has been described, the imaging device 1 may generate information on a line connecting two points on the object OB. Shape information on the object OB may include at least one of the above-mentioned line information and the above-mentioned surface information (mesh information).

For example, such mesh information is able to be generated by adding the information (for example, dx, dy) representing the arrangement of point data F in meshes to setting information De1 in the point cloud data De. In general point cloud data, for example, point data is provided with an index and associated with a line or a surface. By contrast, in the point cloud data De according to the embodiment, for example, similarly to the above-mentioned mesh information, a plurality of pieces of point data F are able to be associated with one another by using the arrangement order (first arrangement order) of the point data F to define a line or a surface (for example, mesh M). For example, the point cloud data De or various kinds of information including mesh information generated by using the point cloud data De according to the embodiment are able to use the order in which data is arranged or the order in which data is read instead of the above-mentioned index. For example, the point cloud data De according to the embodiment is able to omit the above-mentioned index (able to be an indexless data structure), enabling the data amount to be reduced due to the indexless data structure. For example, when various kinds of data such as the object data Dc and the point cloud data De generated by using the object data Dc have an indexless data structure, the number of memory accesses occurring due to the presence of indices (for example, memory accesses to the outside of the CPU) is able to be reduced to increase the speed of processing of the imaging device 1 (for example, the image processor 3, the information calculator 4). For example, when various kinds of data such as the object data Dc and the point cloud data De generated by using the object data Dc have an indexless data structure, arithmetic processing related to indices, such as processing for calculating address positions of data through indices, is able to be reduced to reduce the load on the imaging device 1 (for example, the image processor 3, the information calculator 4).

Referring back to FIG. 1B, the information calculator 4 uses one or both of the point cloud data De and the data generated based on the point cloud data De to calculate model information including at least one of shape information and texture information on the object OB. For example, the information calculator 4 may use the point cloud data De to generate the mesh information described above with reference to FIG. 6A and FIG. 6B as shape information on the object OB. The information calculator 4 may integrate two or more meshes M included in the mesh information to represent one surface. For example, the information calculator 4 may compare adjacent two meshes M (for example, the mesh M1(0,0) and the mesh M2(1,0) in FIG. 6B) in the normal direction to determine whether the two meshes M are on one surface. For example, the information calculator 4 may determine that the two meshes are on one surface when an angle between the normal direction of the mesh M1(0,0) and the normal direction of the mesh M2(1,0) is equal to or smaller than a threshold. When a plurality of meshes M are integrated into one surface, the information calculator 4 may replace information on the meshes M with information on one surface (for example, the point data F on the vertices and the normal direction). The information calculator 4 may generate information on a line connecting two points included in the point cloud data De as shape information on the object OB. The information calculator 4 may generate surface information including coordinates of a plurality of points on the object OB and information on connections between the points. Examples of the surface information include polygon data, vector data, and draw data. For example, the information on connections includes information (the above-mentioned line information) that associates points of both ends of a line corresponding to a ridge (for example, edge) of the object OB with each other and information (the above-mentioned surface information) that associates vertices of a plurality of lines or surfaces corresponding to the contour of surfaces of the object OB with one another. For example, the information calculator 4 uses positional information included in point data F included in the point cloud data De to calculate shape information (for example, line information, surface information) on the object OB. For example, the information calculator 4 uses the arrangement order of the point data F as information representing the relation between points in the point cloud data De, and uses positional information included in the point data F as positions of points in the real space. The imaging device is not necessarily required to include the information calculator 4, and, for example, may output the point cloud data De or the mesh information to the outside as model information or information from which the model information is generated.

The information calculator 4 calculates the texture information by, for example, inverse rendering. The texture information includes, for example, information on at least one item of pattern information representing a pattern of the surface of the object OB, light source information on light applied to the object OB, and optical characteristics information representing optical characteristics (for example, reflectivity and scattering rate) of the surface of the object OB. The light source information includes, for example, information on at least one item of the position of a light source, the direction of light applied from the light source to the object, the wavelength of light applied from the light source, or the type of light source.

For example, the information calculator 4 calculates the light source information by using a model that assumes Lambertian reflectance or a model including Albedo estimation. For example, the information calculator 4 estimates, among pixel values of respective pixels in an image taken by the imager 11, a component derived from light diffused by the object OB and a component regularly reflected by the object OB. For example, the information calculator 4 uses the result of estimating the component regularly reflected by the object OB and shape information to calculate the direction in which light enters the object OB from the light source. For example, the information calculator 4 uses the calculated light source information and shape information to estimate reflection characteristics of the object OB, and calculates optical characteristics information including the estimation result of the reflection characteristics. For example, the information calculator 4 uses the calculated light source information and optical characteristics information to remove the influence of illumination light from visible light image data, and calculates pattern information.

For example, the memory 5 is a non-volatile memory such as a USB memory and a memory card, and stores various kinds of information therein. The memory 5 may include a storage device (for example, a hard disk) built in the imaging device 1, or may include a port to which a storage device that is releasable from the imaging device 1 is connectable.

For example, the communicator 6 includes at least one of an I/O port, such as a USB port, and a communication device that performs wireless communication of radio waves or infrared rays. The communicator 6 is controlled by the controller 7 to read information stored in the memory 5 and transmit the read information to an external device. For example, the communicator 6 transmits at least a part of the point cloud data De and the data (for example, calculation results of the information calculator 4, model information) generated based on the point cloud data De to a device outside the main body 8 (for example, an information processing device 51 illustrated in FIG. 14 and others referred to later). For example, the communicator 6 receives information including instructions from an external device. The communicator 6 is capable of storing the received information in the memory 5 and supplying the received information to the controller 7.

For example, the controller 7 controls the units in the imaging device 1 in response to an instruction (control signal) from a user or an external device. For example, the controller 7 controls the detector 2 to execute detection processing. For example, the detection processing includes imaging processing by the imager 11 and distance detection processing by the distance measurer 12. For example, the controller 7 stores at least a part of detection results of the detector 2 in the memory 5. For example, the controller 7 controls the object data generator 21 to generate the object data Dc and store the generated object data Dc in the memory 5. For example, the controller 7 controls the point cloud data generator 22 to generate the point cloud data De and store the generated point cloud data De in the memory 5. For example, the controller 7 controls the information calculator 4 to calculate model information. For example, the controller 7 stores at least part of the model information calculated by the information calculator 4 in the memory 5.

For example, the imaging device 1 is capable of outputting at least a part of the model information to a digital device capable of inputting and outputting digital information such as a barcode and a two-dimensional code. Such a digital device is capable of displaying or printing digital information including at least a part of the model information on a display or paper. A reader device including a reader (for example, an optical reader) capable of reading displayed or printed digital information is capable of inputting the digital information to a storage area in the reader device through the reader. The reader device may further include a rendering processor described later. The above-mentioned imaging system 50 may include the digital device or the reader device including the reader described above. The imaging device 1 may include the digital device or the reader device described above. When the imaging device 1 includes the above-mentioned digital device, the communicator 6 may transmit at least a part of the model information to the above-mentioned digital device. The above-mentioned digital device may generate digital information based on received model information and output the digital information to a medium such as paper.

Figure 7:
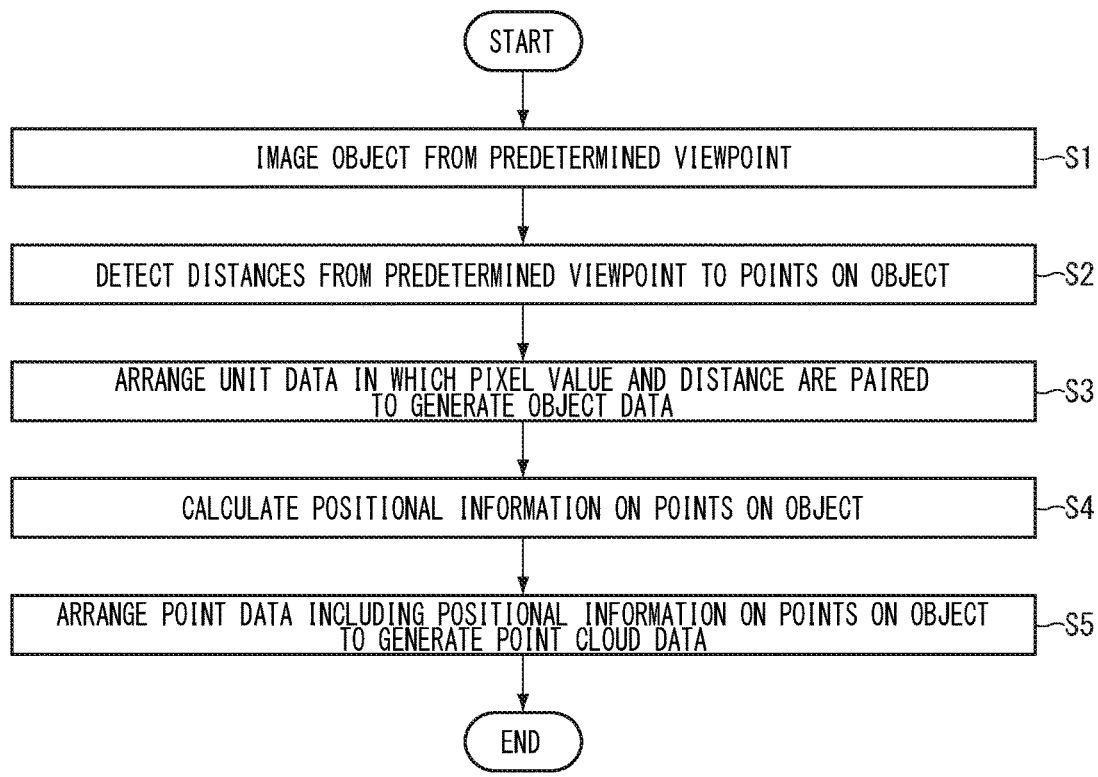
FIG. 7 is a flowchart illustrating a detection method according to the embodiment.

Next, a detection method according to the first embodiment is described based on the operation of the imaging device 1 having the above-mentioned configuration. FIG. 7 is a flowchart illustrating the detection method according to the embodiment. In Step S1, the imager 11 images an object OB from a predetermined viewpoint Vp. In Step S2, the distance measurer 12 detects distances from the predetermined viewpoint to points on the object OB. For example, the controller 7 controls the distance measurer 12 to cause the distance measurer 12 to execute detection processing. The processing in Step S2 may be executed before the processing in Step S1, or may be executed in parallel with at least a part of the processing in Step S1.

In Step S3, the object data generator 21 arranges unit data in which the pixel value and the distance are paired to generate the object data Dc (see FIG. 5A). In Step S4, the point cloud data generator 22 uses the object data Dc generated by the object data generator 21 in Step S4 to calculate positional information (for example, coordinates) on points on the object OB. In Step S5, the point cloud data generator 22 arranges point data F (see FIG. 5B and FIG. 5C) including the positional information on the points on the object OB to generate the point cloud data De.

Second Embodiment

Figure 8A:
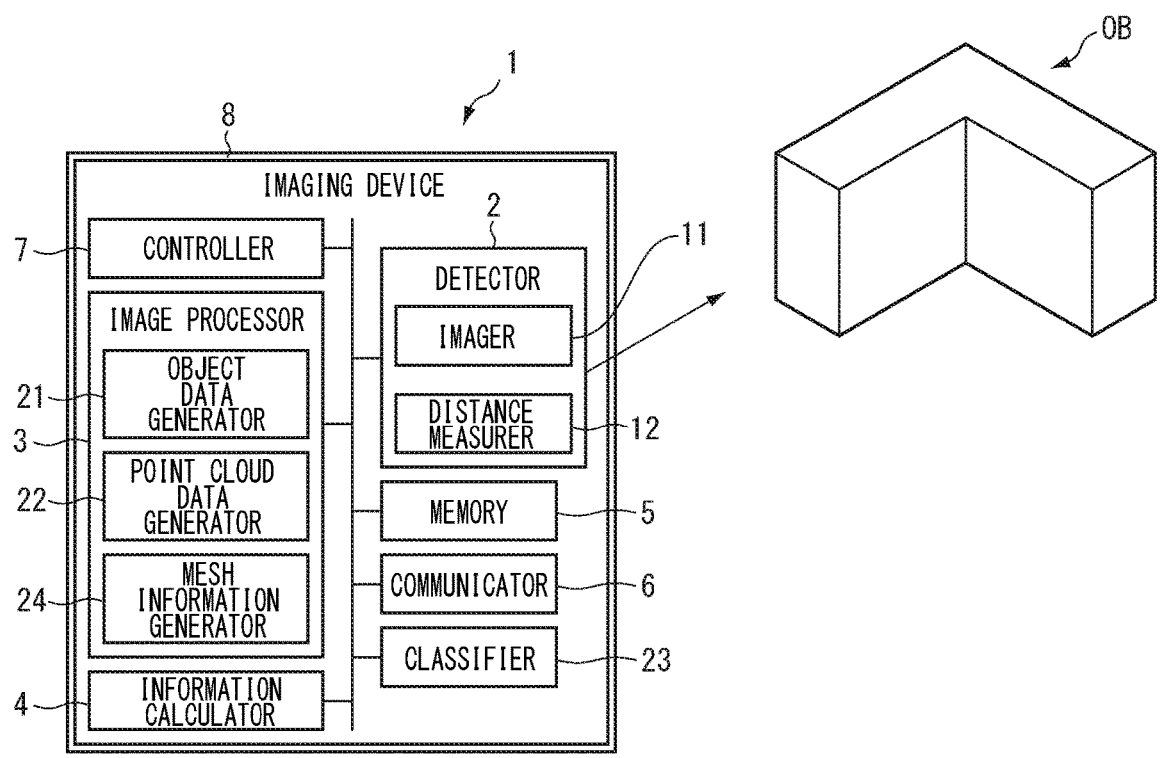
FIGS. 8A and 8B include diagrams illustrating an imaging device according to a second embodiment.
Figure 8B:
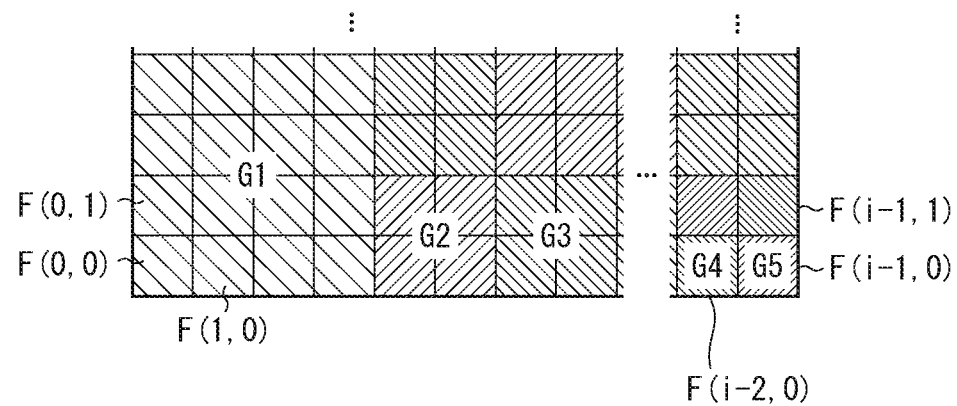

A second embodiment is described. In the second embodiment, the same configurations as in the above-mentioned embodiment are denoted by the same reference symbols, and descriptions thereof are omitted or simplified. FIG. 8A is a diagram illustrating an imaging device 1 according to the second embodiment. The imaging device 1 includes a classifier 23 and a mesh information generator 24. FIG. 8B is a conceptual diagram in which point data F in the point cloud data De is two-dimensionally arranged corresponding to the object data Dc. As illustrated in FIG. 8B, the classifier 23 classifies the point data F included in the point cloud data De into a plurality of groups G based on positional information (for example, the coordinates (X,Y,Z) of the point data F). In FIG. 8B, groups G1 to G5 are illustrated as representatives of the groups G. The groups G each include one or two or more pieces of point data F. The group G1 includes 16 pieces of point data F in four rows and four columns. The group G2 and the group G3 each include four pieces of point data F in two rows and two columns. The group G4 and the group G5 each include one piece of point data F in one row and one column.

For example, the classifier 23 classifies the point data F such that all pieces of point data F included in the point cloud data De belong to any of the groups. For example, the classifier 23 classifies the point data F estimated to be included in the same surface into the same group. For example, when adjacent parts (points, lines, surfaces) in the detection region A1 by the detector 2 are estimated to be included in the same surface, the classifier 23 classifies the point data F corresponding to these parts into the same group. For example, the classifier 23 classifies the point data F estimated to be included in different surfaces into different groups. For example, when adjacent parts (points, lines, surfaces) in the detection region A1 by the detector 2 are estimated to be included in different surfaces, the classifier 23 classifies the point data F corresponding to these parts into different groups.

Figure 9A:
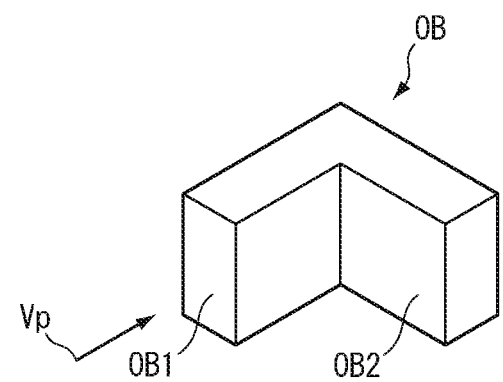
FIGS. 9A to 9C include diagrams illustrating processing by a classifier according to the second embodiment.
Figure 9B:
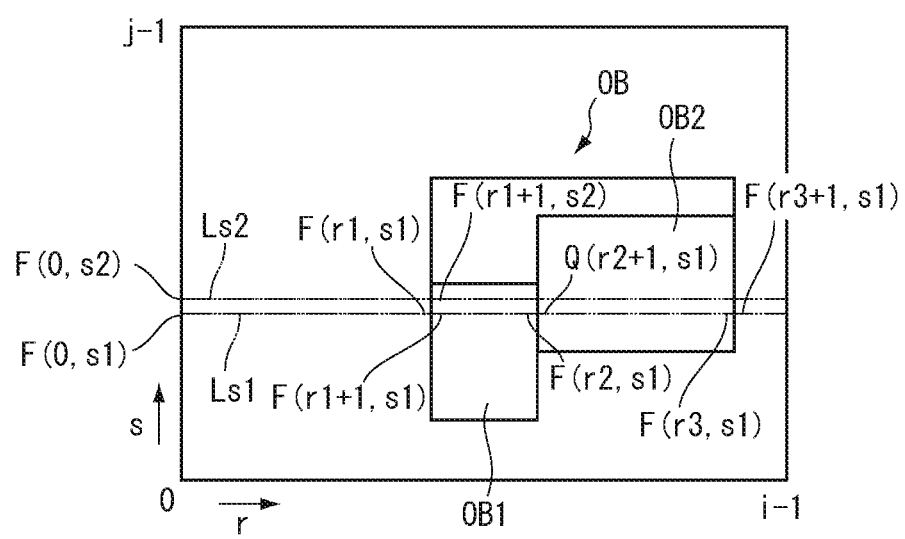
Figure 9C:
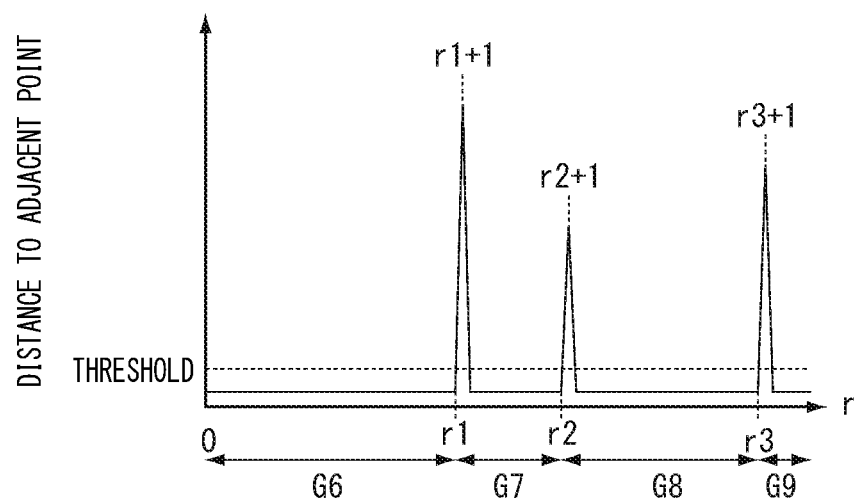

FIGS. 9A to 9C includes diagrams illustrating an example of processing by the classifier 23 according to the second embodiment. FIG. 9A is a diagram illustrating an example of a relation between an object OB and a predetermined viewpoint Vp. In FIG. 9A, symbols OB1 and OB2 are surfaces on the object OB. FIG. 9B is a diagram conceptually illustrating the point cloud data De in association with the object OB. For example, the classifier 23 sequentially calculates distances between point data F(r,s) and adjacent point data F(r+1,s) included in the point cloud data De along a line Ls1. The line Ls1 is a line connecting point data F(0,s1) and point data F(i−1,s1), where s1 is an integer of 0 or more and (j−2) or less.

FIG. 9C is a diagram conceptually illustrating a relation between the value of r in the point data F(r,s) and the distance from adjacent point data F on the line Ls1. r is an integer of 0 or more and (i−2) or less. The vertical axis in FIG. 9C is a distance (hereinafter referred to as "point-to-point distance") between coordinates (X(r,s),Y(r,s),Z(r,s)) represented by the point data F(r,s) and coordinates (X(r+1,s),Y(r+1,s),Z(r+1,s)) represented by the point data F(r+1,s).

In the example in FIG. 9B, a part from the point data F(0,s1) to point data F(r1,s1) is a background part of the object OB, and the point-to-point distance is smaller than a threshold. Point data F(r+1,s1) is a part corresponding to the surface OB1 of the object OB, and is disposed on a surface different from that of the point data F(r1,s1). For example, there is a step between a part corresponding to the point data F(r1,s1) and a part corresponding to the point data F(r+1,s1), and as illustrated in FIG. 9C, the point-to-point distance between the point data F(r1,s1) and the point data F(r+1,s1) is larger than the threshold. For example, when the point-to-point distance between the point data F(r,s) and the adjacent point data F(r+1,s), which are adjacent in a first direction (a direction r), is smaller than the threshold, the classifier 23 classifies the point data F(r,s) and the point data F(r+1,s) into the same group. For example, the point-to-point distance between the point data F(r,s) and the point data F(r+1,s) adjacent to each other is equal to or larger than the threshold, the classifier 23 classifies the point data F(r+1,s) into a group different from that of the point data F(r,s). For example, the classifier 23 classifies the point data F(0,s1) to the point data F(r1,s1) into a group G6, and classifies the point data F(r+1,s1) to point data F(r2,s1) into a group G7 different from the group G6. Similarly, the classifier 23 classifies point data F(r2+1,s1) to point data F(r3,s1) into a group G8, and classifies point data F(r3+1,s1) to the point data F(i−1,s1) into a group G9.

The classifier 23 performs similar processing along a line Ls2 obtained by shifting the line Ls1 in a second direction (a direction s). The line Ls2 is a line connecting point data F(0,s2) and point data F(i−1,s2), where s2 is, for example, (s1+1). For example, the classifier 23 subjects point data F(r1+1,s2) to processing for comparing the point-to-point distance between the point data F(r1+1,s2) and point data F(r1+2,s2) adjacent to each other on the line Ls2 with a threshold and processing for comparing the point-to-point distance between the point data F(r1+1,s2) and point data F(r1+1,s1) adjacent in the direction s with the threshold. The classifier 23 compares the point-to-point distance between the point data F(r1+1,s2) and the point data F(r1+1,s1) with the threshold to determine whether to classify the point data F(r1+1,s2) into the group G7. The classifier 23 repeats the above-mentioned processing while sequentially changing the values of r and s, thereby classifying the point data F included in the point cloud data De into a plurality of groups G. For example, the classifier 23 generates, as information on groups, information in which information that distinguishes the groups G is associated with point data F belonging to each group. For example, the classifier 23 stores the generated information on groups in the memory 5.

The processing in FIGS. 9A to 9C is an example, and the classifier 23 may classify the point data F included in the point cloud data De into groups G by another processing. For example, the classifier 23 may use the mesh information described above with reference to FIG. 6A and FIG. 6B to determine whether adjacent meshes M are present on the same surface, and may classify meshes M present on the same surface into the same group and classify meshes M present on different surfaces into different groups. For example, the processing for determining whether adjacent meshes M are present on the same surface is able to be implemented by comparing adjacent meshes M in the normal direction.

Figure 10A:
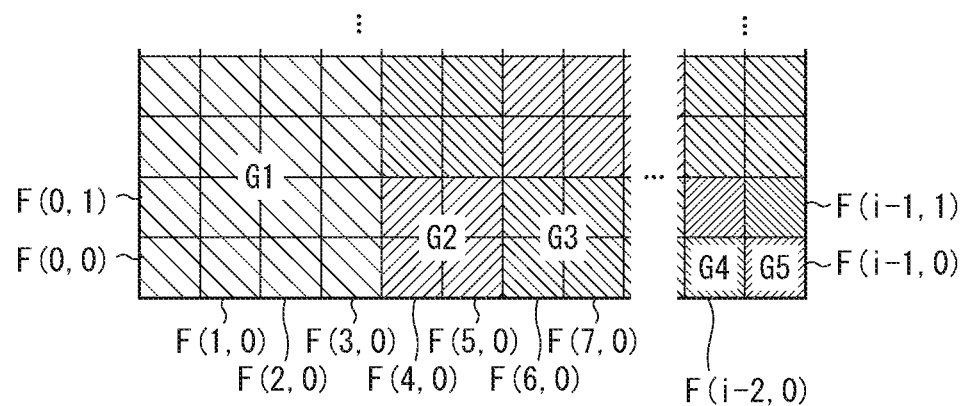
FIGS. 10A and 10B includes diagrams illustrating processing and mesh information by the classifier according to the second embodiment.
Figure 10B:
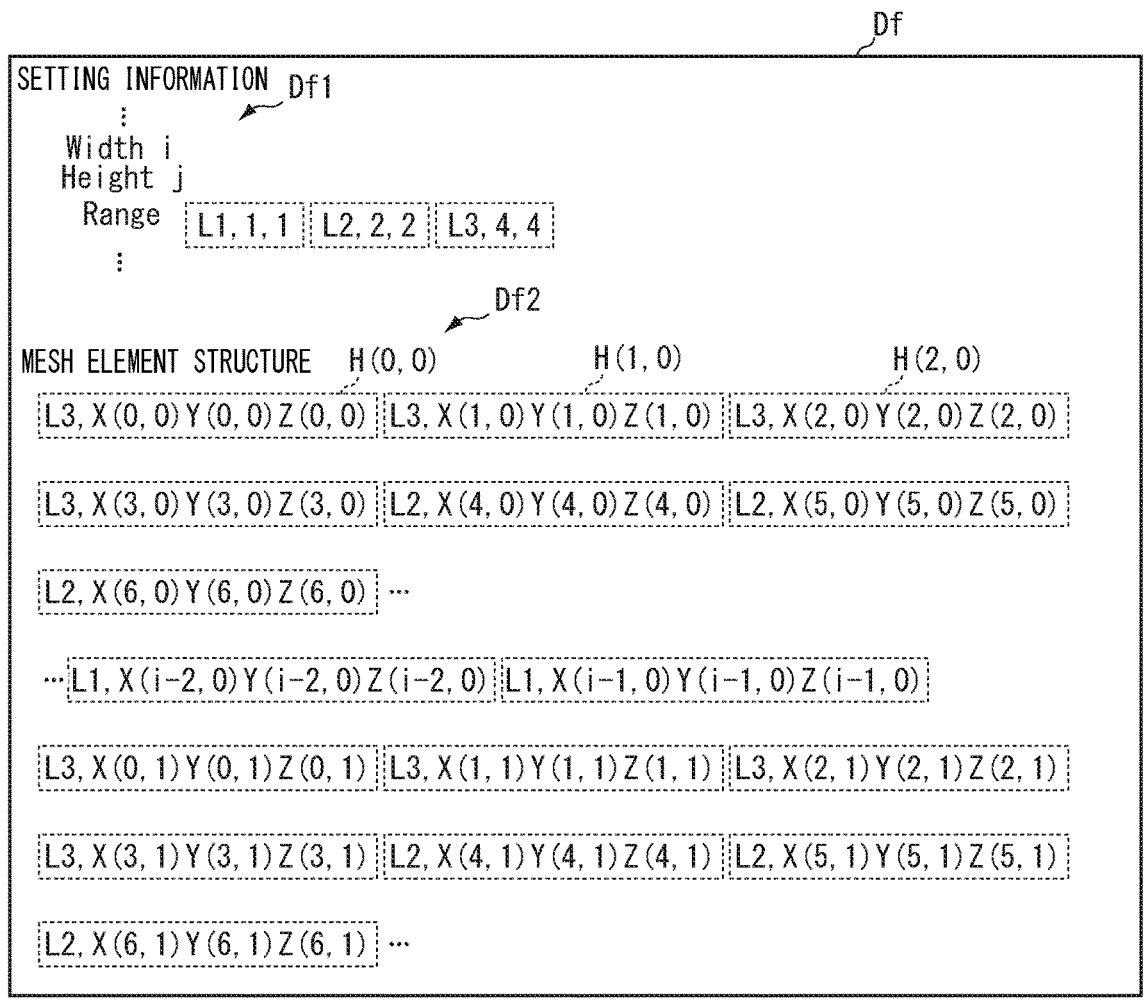

FIGS. 10A and 10B include conceptual diagrams illustrating a plurality of groups and mesh information. The classifier 23 classifies the groups G into a plurality of hierarchies in accordance with the arrangement of point data F in groups. The arrangement of point data F belonging to each group may be the arrangement of unit data E (see FIG. 5A) in the object data Dc corresponding to the point data F. At least one of the groups G may be a group to which point data F on successive pixels P in the taken image Im1 (see FIG. 3A), and the arrangement of point data F belonging to each group may be the arrangement of pixels corresponding to the point data F in the taken image Im1.

For example, the classifier 23 classifies groups having the same arrangement of point data F belonging thereto (size in a direction i, size in a direction j) into the same hierarchy, and classifies groups having different arrangement of point data F belonging thereto into different hierarchies. For example, in FIG. 10A, in the group G4 and the group G5, the point data F belonging thereto is in one row and one column, and the classifier 23 classifies such groups into a hierarchy of level 1 (data level 1). For example, in the group G2 and the group G3, the point data F belonging thereto is in two rows and two columns, and the classifier 23 classifies such groups into a hierarchy of level 2. For example, in the group G1, the point data F belonging thereto is in four rows and four columns, and the classifier 23 classifies such a group into a hierarchy of level 3. In the groups G, the number of pieces of point data F belonging to each group G is different among groups having different hierarchies. For example, in the groups G, the number of pieces of point data F belonging to the group G4 with a hierarchy of level is one, and the number of pieces of point data F belonging to the group G2 of level 2 is four. The groups G may include groups having the same number of pieces of point data F belonging thereto but having different hierarchies. For example, a group to which point data F in one row and four columns belongs and a group to which point data F in two rows and two columns belongs may have different hierarchies depending on how the point data F is arranged although the numbers of pieces of point data F belonging to the groups are the same (four).

For example, information on groups G classified by the classifier 23 is used to define meshes M. For example, the meshes M may be defined for each group G, or may be defined in a one-to-one correspondence with groups G. The mesh information generator 24 (see FIG. 8A) generates mesh information Df as illustrated in FIG. 10B in which mesh elements H are arranged. For example, the mesh information Df is information that defines meshes. For example, the mesh information Df includes setting information Df1 and a mesh element structure Df2.

For example, the setting information Df1 is header information, and is read first in the mesh information Df when the mesh information Df is read to an image processing device or the like. The setting information Df1 includes hierarchy information on hierarchies of levels (denoted by "Range" in FIG. 10B). For example, the hierarchy information includes information representing the arrangement of point data F belonging to groups of hierarchies of levels. For example, the arrangement of point data is represented by a pair of the range of x and the range of y (for example, y rows and x columns) when the point data is represented by F(x,y).

For example, "L1,1,1" is hierarchy information on a hierarchy of level 1. "L1" is data representing the level of the hierarchy, and is, for example, fixed-length data represented by a predetermined number of bits. "1,1" following "L1" is arrangement information representing the arrangement of point data F belonging to a group having a hierarchy of level represented by "L1", and, for example, arrangement information having a hierarchy of level 1 represents that the range of x (the number of columns) is 1 and the range of y (the number of rows) is one (one row and one column). "L2,2,2" is hierarchy information on a hierarchy of level 2, and, for example, arrangement information having a hierarchy of level 2 represents that the range of x (the number of columns) is two and the range of y (the number of rows) is two (two rows and two columns). "L3,4,4" is hierarchy information on a hierarchy of level 3, and, for example, arrangement information on a hierarchy of level 3 represents that the range of x (the number of columns) is four and the range of y (the number of rows) is four (four rows and four columns). Description is given on the assumption that the number of hierarchies is three, but the number of hierarchies may be one and may be any number such as two or more and four or more. The range of x and the range of y of the arrangement of point data F belonging to a group of a hierarchy of each level are set to a desired value in advance.

The mesh element structure Df2 is a structure in which mesh elements H are serially arranged. For example, a mesh element H is data in which point data F constituting a mesh M and information on a group to which the point data F belongs (for example, the level of hierarchy of the group) are paired. A mesh element corresponding to point data F(x,y) is represented by symbol H(x,y). For example, a mesh element H(0,0) corresponds to the point data F(0,0), and belongs to the group G1 in FIG. 10A. The group G1 has a hierarchy of level 3 (four rows and four columns), and, for example, the mesh element H(0,0) has a structure in which a flag "L3" representing the level of the hierarchy of the group G1 to which the point data F(0,0) belongs and X(0,0), Y(0,0), and Z(0,0) representing the coordinates of the point data F(0,0) are arranged. In each mesh element H, for example, the information on the group (for example, the flag "L3" representing the level of hierarchy) is arranged before the coordinates (X,Y,Z). In each mesh element H, for example, the information on the group (for example, the flag "L3" representing the level of hierarchy) is read before the coordinates (X,Y,Z).

In FIG. 10A, the point data F(0,0) to point data F(3,0) belongs to the group G1 having a hierarchy of level 3, and the mesh element H(0,0) to a mesh element H(3,0) corresponding to these pieces of point data F are provided with the flag "L3" representing level 3. Similarly, point data F(4,0) and point data F(5,0) belongs to the group G2 having a hierarchy of level 2, and a mesh element H(4,0) and a mesh element H(5,0) are provided with a flag "L2" representing level 2. In the mesh element structure Df2, for example, the mesh information Df is read by sequential access. For example, a device that uses the mesh information Df collates the flag "L3" with the setting information Df1 when the mesh element H(0,0) is read, whereby the device is capable of determining that a group to which the mesh element (0,0) belongs includes mesh elements H in four rows and four columns. For example, this device is capable of determining that, for example, the mesh element H(0,0) to the mesh element H(3,0) belong to the same group G1 (mesh). For example, at the timing when the mesh element H(0,0) is read, this device is capable of determining that three mesh elements H to be read subsequently to the mesh element H(0,0) belong to the group G1, which is the same group as that of the mesh element H(0,0). For example, this device is capable of determining that a mesh element (4,0) to be read next to a mesh element (3,0) belongs to the group G2, which is a different group from that of the mesh element (3,0). For example, the mesh information Df may be read by random access.

Referring back to FIG. 8A, for example, the mesh information generator 24 acquires the point cloud data De and information on groups from the memory 5, and uses the point cloud data De and the information on groups to generate mesh information Df. For example, the mesh information generator 24 reads pieces of point data F in the point cloud data De by sequential access, and adds the information on groups (for example, the flags "L1" to "L3") to the pieces of point data F to generate mesh elements H. For example, the mesh information generator 24 stores the generated mesh elements H in the mesh element structure Df2 in the order in which the corresponding pieces of point data F are read (for example, the first arrangement order) to generate mesh information Df. For example, the mesh information generator 24 stores the generated mesh information Df in the memory 5 (see FIG. 1B).

The information calculator 4 uses one or both of the point cloud data De and the data generated based on the point cloud data De to calculate model information including at least one of shape information and texture information on the object OB. For example, the information calculator 4 uses the mesh information Df generated by the mesh information generator 24 to calculate shape information on the object OB. For example, the information calculator 4 reads the mesh elements H in the mesh information Df by sequential access, and calculates shape information on the object OB. For example, the information calculator 4 uses each group defined by the mesh information Df to generate information on surfaces on the object OB. For example, the information calculator 4 uses the mesh elements H belonging to one group to generate information on lines (perimeter lines) corresponding to the contour of surfaces. For example, the information on the lines includes coordinates of points corresponding to end points. For example, the information calculator 4 associates a plurality of pieces of information on lines corresponding to the perimeter line of one surface with one another to generate surface information on one surface. For example, the information calculator 4 generates, as surface information, information representing the normal direction of each surface. For example, the information calculator 4 may generate, as surface information, information in which coordinates of a plurality of vertices of a surface are associated. For example, in the mesh information Df according to the embodiment, the order in which the mesh elements H are arranged or the order in which the mesh elements H are read is useable instead of an index. For example, the mesh information Df according to the embodiment is able to omit the above-mentioned index (able to have an indexless data structure), enabling the data amount to be reduced. For example, when the mesh information Df has an indexless data structure, the number of memory accesses occurring due to the presence of indices (for example, memory accesses to the outside of the CPU) is able to be reduced to increase the speed of processing of the imaging device 1 (for example, the information calculator 4). For example, when the mesh information Df has an indexless data structure, arithmetic processing related to indices, such as processing for calculating address positions of data through indices, is able to be reduced to reduce the load on the imaging device 1 (for example, the information calculator 4).

Third Embodiment

A third embodiment is described. In the third embodiment, the same configurations as in the above-mentioned embodiments are denoted by the same reference symbols, and descriptions thereof are omitted or simplified. The imaging device 1 includes a texture information generator 25 that generates texture information. For example, the texture information generator 25 generates texture information by using information on groups described above in the second embodiment. For example, the texture information generator 25 generates texture information by using the mesh information Df including information on groups.

Figure 12:
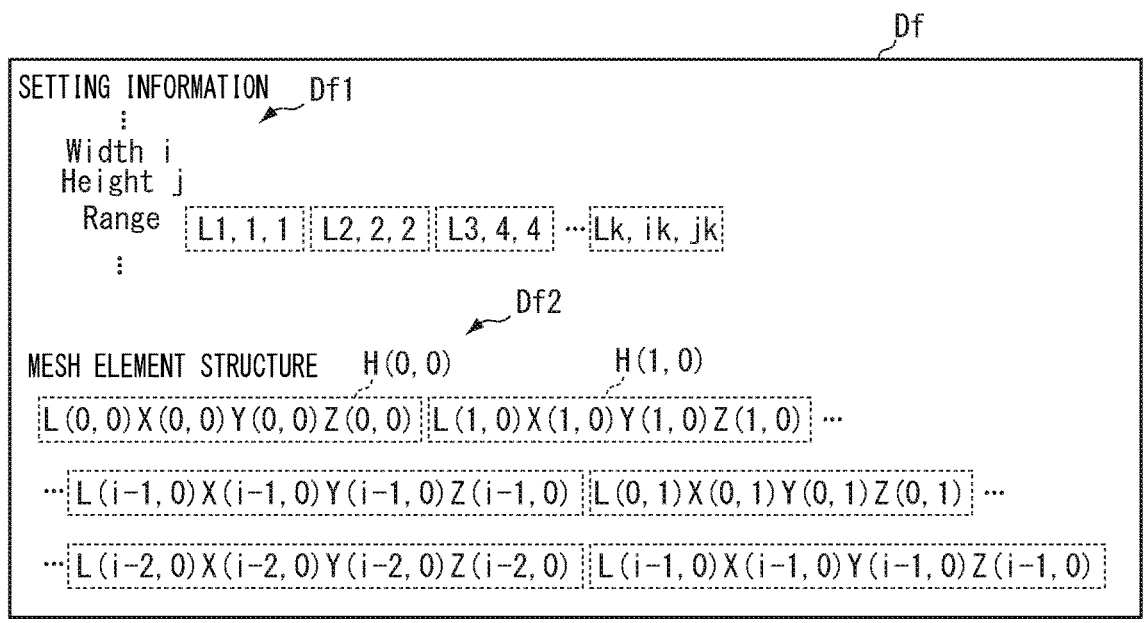
FIG. 12 is a diagram illustrating mesh information and texture information according to the third embodiment.
Figure 12:
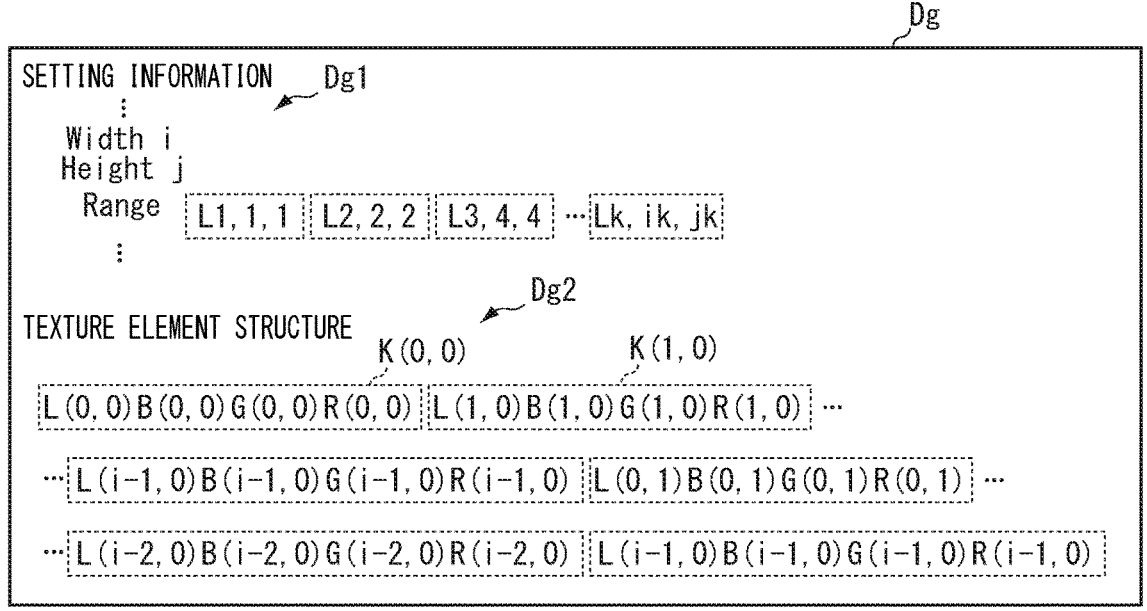

As illustrated in FIG. 12, the mesh information Df includes the setting information Df1, and the setting information Df1 includes arrangement information ("Range" in FIG. 12) on point data F belonging to groups G having hierarchies of levels. "Lk,ik,jk" is arrangement information in which the level is k, where "Lk" is the level of hierarchy, "ik" is the number of pieces of point data F arranged in a first direction in the arrangement of point data F belonging to a group having a hierarchy of level k, and "jk" is the number of pieces of point data F arranged in a second direction in the arrangement of the point data F belonging to the group having a hierarchy of level k. For example, when "Lk" is 5, "ik" is 2, and "jk" is 3, this arrangement information represents that point data F belonging to a group G having a hierarchy of level 5 have three rows and two columns. The mesh element structure Df2 in the mesh information Df is a structure in which a plurality of mesh elements H are arranged. A mesh element corresponding to point data $F(x,y)$ in the point cloud data De is represented by symbol $H(x,y)$. In a mesh element $H(x,y)$, $L(x,y)$ is the level of the hierarchy of the group to which the mesh element H belongs, and any of L1 to Lk is allocated.

Texture information Dg includes setting information Dg1 and a texture element structure Dg2. The texture element structure Dg2 is a structure in which a plurality of texture elements K are serially arranged. For example, the texture elements K are disposed in a one-to-one correspondence with mesh elements H in the mesh information Df. A texture element K corresponding to the mesh element $H(x,y)$ is represented by symbol $K(x,y)$. The texture elements K are arranged in the above-mentioned first arrangement order. For example, the texture elements K are arranged while maintaining the arrangement order of the mesh elements H in the mesh information Df. In the mesh information Df, the mesh information Df is arranged while maintaining the arrangement order of point data F in the point cloud data De, and the texture elements K are arranged while maintaining the arrangement order of point data F in the point cloud data De.

The texture element K has a structure in which the level $L(x,y)$ of a hierarchy of a group to which the texture element K belongs and pixel values (B,G,R) corresponding to the texture element K are sequentially arranged. In each texture element K, for example, information on the group (for example, $L(x,y)$) is arranged before the pixel values (B,G,R). In each texture element K, for example, information on the group (for example, $L(x,y)$) is read before the pixel value (B,G,R). As described above with reference to FIG. 5B, the pixel values (B,G,R) are pixel values of a part corresponding to point data F in the detection region A1 by the detector 2. For example, a pixel value $B(0,0)$, a green pixel value $G(0,0)$, and a red pixel value $R(0,0)$ are pixel values of a pixel corresponding to the point data $F(0,0)$ in the taken image Im1.

Figure 11:
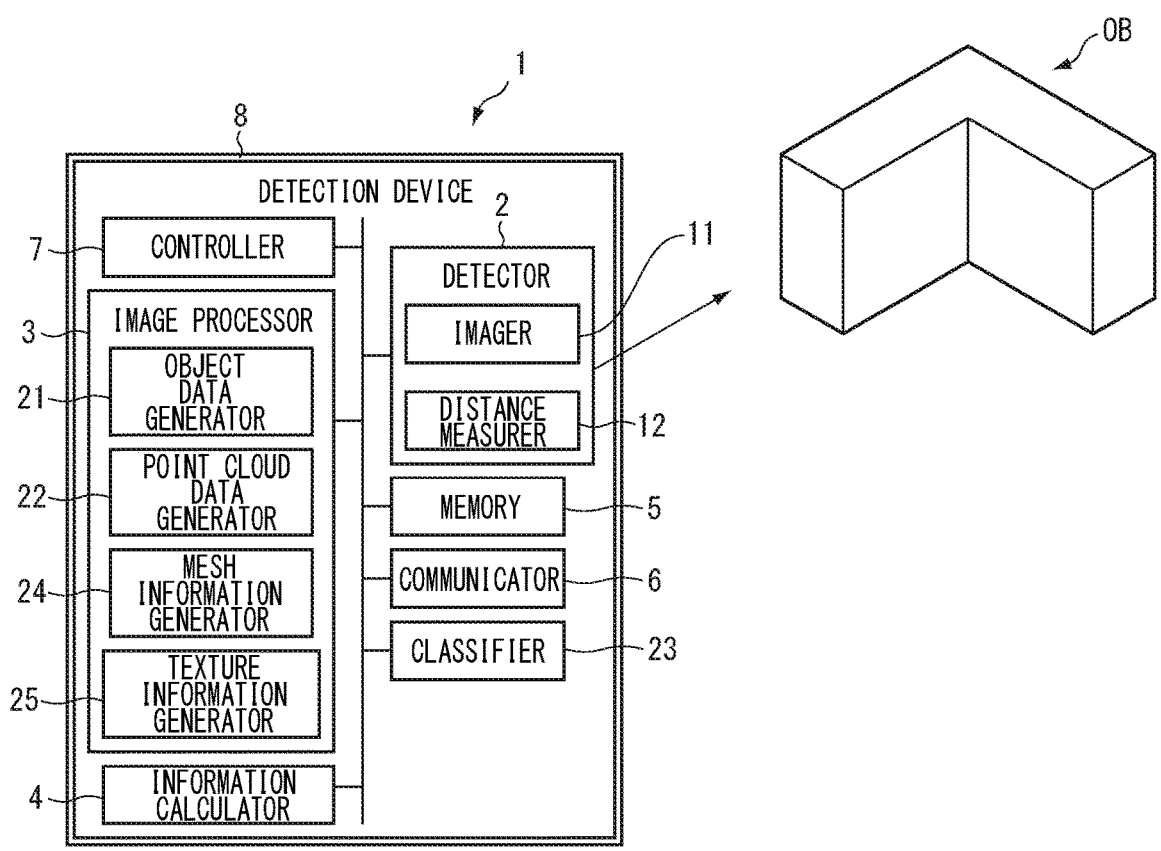
FIG. 11 is a diagram illustrating an imaging device according to a third embodiment.

Similarly to the setting information Df1 in the mesh information Df, the setting information Dg1 includes arrangement information ("Width" and "Height" in FIG. 12) representing the arrangement of mesh elements H and arrangement information ("Range" in FIG. 12) on point data F belonging to groups having hierarchies of levels. For example, the texture information generator 25 uses the point cloud data De in FIG. 5B and information on groups G generated by the classifier 23 to generate texture information Dg. For example, the texture information generator 25 reads pieces of point data F in the point cloud data De in FIG. 5B by sequential access, and extracts pixel values from each piece of point data F. For example, the texture information generator 25 adds the level (Lk) of the hierarchy of the group G to which the point data F belongs to the extracted pixel values to generate a texture element K. The texture information generator 25 stores the texture elements K corresponding to the pieces of point data F in the texture element structure Dg2 in the order in which the pieces of point data F are read, thereby generating texture information Dg. For example, the texture information generator 25 stores the generated texture information Dg in the memory 5 (see FIG. 11). The information calculator 4 may perform processing (for example, process, reconstruction) on the texture information Dg generated by the texture information generator 25. For example, the information calculator 4 may read texture elements K in the texture information Dg by sequential access, and reconstruct the texture elements K as information for each group.

In the above-mentioned embodiments, the image processor 3 (image processing device) includes a computer system, for example. The image processor 3 reads an image processing program stored in the memory 5, and executes various kinds of processing in accordance with the image processing program. For example, the image processing program causes a computer to execute: generating object data by using an image of an object taken from a predetermined viewpoint and measurement results of distances from the predetermined viewpoint to points on the object, in the object data, unit data including pairs each having a pixel value in the taken image and a distance from a point on the object corresponding to the pixel value to the predetermined viewpoint being arranged in a first arrangement order; and generating point cloud data by calculating positional information on the points on the object based on the object data and arranging point data including the positional information in the first arrangement order. The image processing program may be recorded in a computer-readable storage medium to be provided. The image processor 3 may include a digital signal processor (DSP) and may include an application specific integrated circuit (ASIC).

Fourth Embodiment

Figure 13:
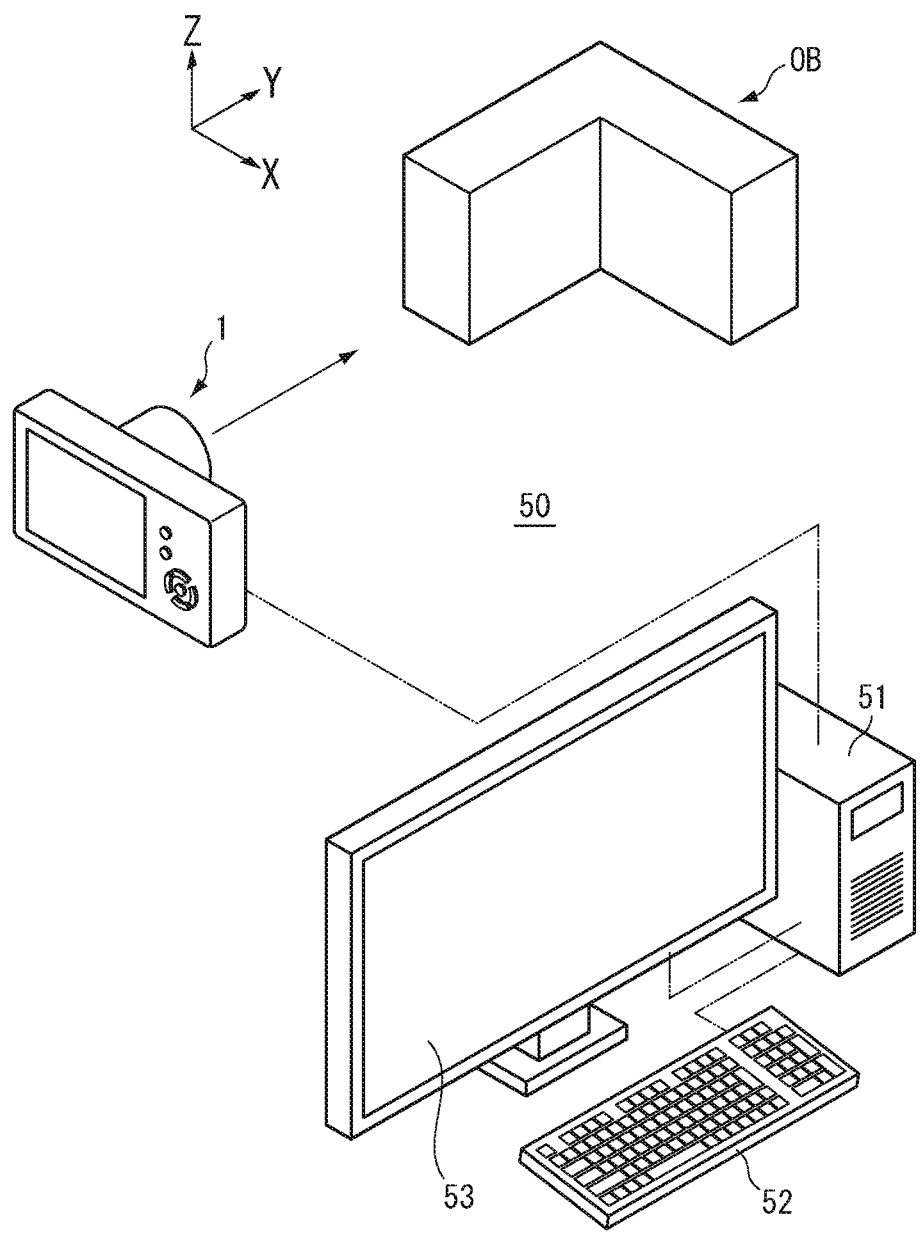
FIG. 13 is a diagram illustrating a detection system according to a fourth embodiment.

A fourth embodiment is described. In the fourth embodiment, the same configurations as in the above-mentioned embodiments are denoted by the same reference symbols, and descriptions thereof are omitted or simplified. FIG. 13 is a diagram illustrating an example of an imaging system 50 to which the imaging device 1 according to the embodiment is applied. The imaging system 50 includes the imaging device 1 and the information processing device 51 that processes information output from the imaging device 1. For example, the information processing device 51 is provided with an input device 52 and a display device 53.

As illustrated in FIGS. 5A to 5C and other figures, the imaging device 1 generates the point cloud data De in which point data F is arranged in the first arrangement order (the predetermined arrangement order). For example, the imaging device 1 performs processing that uses the point cloud data De to generate shape information (for example, mesh information, surface information) on an object OB. For example, the imaging device 1 generates texture information on the object OB. For example, the imaging device 1 is capable of easily processing the point cloud data De by sequential access because the point data F is arranged in the point cloud data De in the first arrangement order. When the point data F is arranged in the point cloud data De in the first arrangement order, for example, the imaging device 1 is able to reduce the load on processing that uses the point cloud data De. For example, the imaging device 1 is able to be downsized to be portable because the load on the processing that uses the point cloud data De is able to be reduced. For example, the imaging device 1 transmits (outputs) model information including at least part of shape information and texture information on the object OB to the outside.

The information processing device 51 acquires information from the imaging device 1 through communication with the imaging device 1. For example, information processing device 51 executes the rendering processing by using the information (for example, model information) acquired from the imaging device 1. For example, on the basis of setting information on a viewpoint input to the input device 52 by the user, the information processing device 51 calculates data on an estimated image obtained by viewing the object OB from this viewpoint. For example, the information processing device 51 supplies the data on the estimated image to the display device 53 and displays the estimated image on the display device 53.

The input device 52 includes, for example, at least one of a keyboard, a mouse, a touch panel, a sensor such as an acceleration sensor, a voice input machine, and a touch pen. The input device 52 is connected to the information processing device 51. For example, the input device 52 receives input of information from the user and supplies the input information to the information processing device 51. The display device 53 includes, for example, a liquid crystal display or a touch panel display and is connected to the information processing device 51. For example, the display device 53 displays an image (for example, an estimated image by the rendering processing) by using image data supplied from the information processing device 51.

Figure 14:
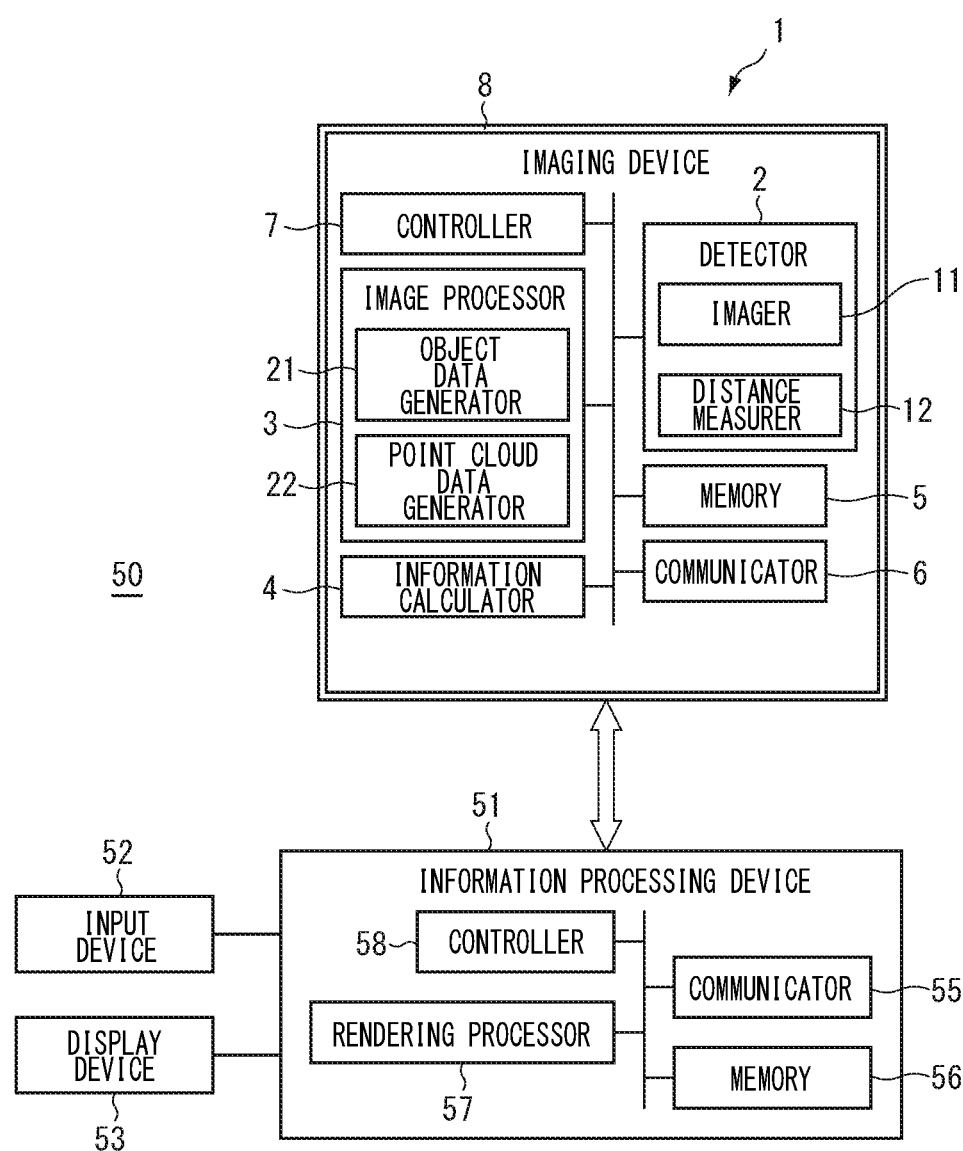
FIG. 14 is a diagram illustrating the detection system according to the fourth embodiment.

FIG. 14 is a block diagram illustrating an example of the imaging system 50 according to the fourth embodiment. The information processing device 51 includes a communicator 55, a memory 56, a rendering processor 57, and a controller 58. For example, the communicator 55 includes at least one of a USB port, a network card, or a communication device that performs wireless communication by radio waves or infrared rays. The communicator 55 is communicable with the communicator 6 in the imaging device 1.

For example, the memory 56 includes a removable storage medium such as a USB memory, or an external or built-in large-capacity storage device such as a hard disk. For example, the memory 56 stores therein data on at least a part of information received via the communicator 55, an imaging control program for controlling the imaging device 1, and a processing program for executing each processing in the information processing device 51.

The rendering processor 57 includes, for example, a graphics processing unit (GPU). The rendering processor 57 may have an aspect in which a CPU and a memory execute each processing in accordance with an image processing program. For example, the rendering processor 57 executes at least one of drawing processing, texture mapping processing, or shading processing.

In the drawing processing, for example, the rendering processor 57 is able to calculate an estimated image (for example, a reconstructed image) in which the shape defined by shape information in model information is viewed from a freely selected viewpoint. In the following description, the shape represented by shape information is referred to as "model shape". For example, the rendering processor 57 is able to reconstruct a model shape (for example, an estimated image) from model information (for example, shape information) through the drawing processing. For example, the rendering processor 57 stores data on the calculated estimated image in the memory 56. In the texture mapping processing, for example, the rendering processor 57 is able to calculate an estimated image obtained by attaching an image represented by the texture information in the model information to the surface of the object on the estimated image. The rendering processor 57 is also able to calculate an estimated image obtained by attaching another texture than the object OB on the surface of the object on the estimated image. In the shading processing, for example, the rendering processor 57 is able to calculate an estimated image in which the shade formed by a light source represented by light source information in the model information is added to the object on the estimated image. In the shading processing, for example, the rendering processor 57 is able to calculate an estimated image in which the shade formed by a freely selected light source is added to the object on the estimated image.

For example, the controller 58 controls each component in the information processing device 51, the imaging device 1, the input device 52, and the display device 53. For example, the controller 58 controls the communicator 55 to transmit an instruction (a control signal) and setting information to the imaging device 1. For example, the controller 58 stores information received by the communicator 55 from the imaging device 1 in the memory 56. For example, the controller 58 controls the rendering processor 57 to execute the rendering processing.

The imaging system 50 does not necessarily include the input device 52. For example, to the imaging system 50, various kinds of instructions and information may be input via the communicator 6. The imaging system 50 does not necessarily include the display device 53. For example, the imaging system 50 may output the data on the estimated image generated by the rendering processing to an external display device, and this display device may display the estimated image.

Fifth Embodiment

Figure 15:
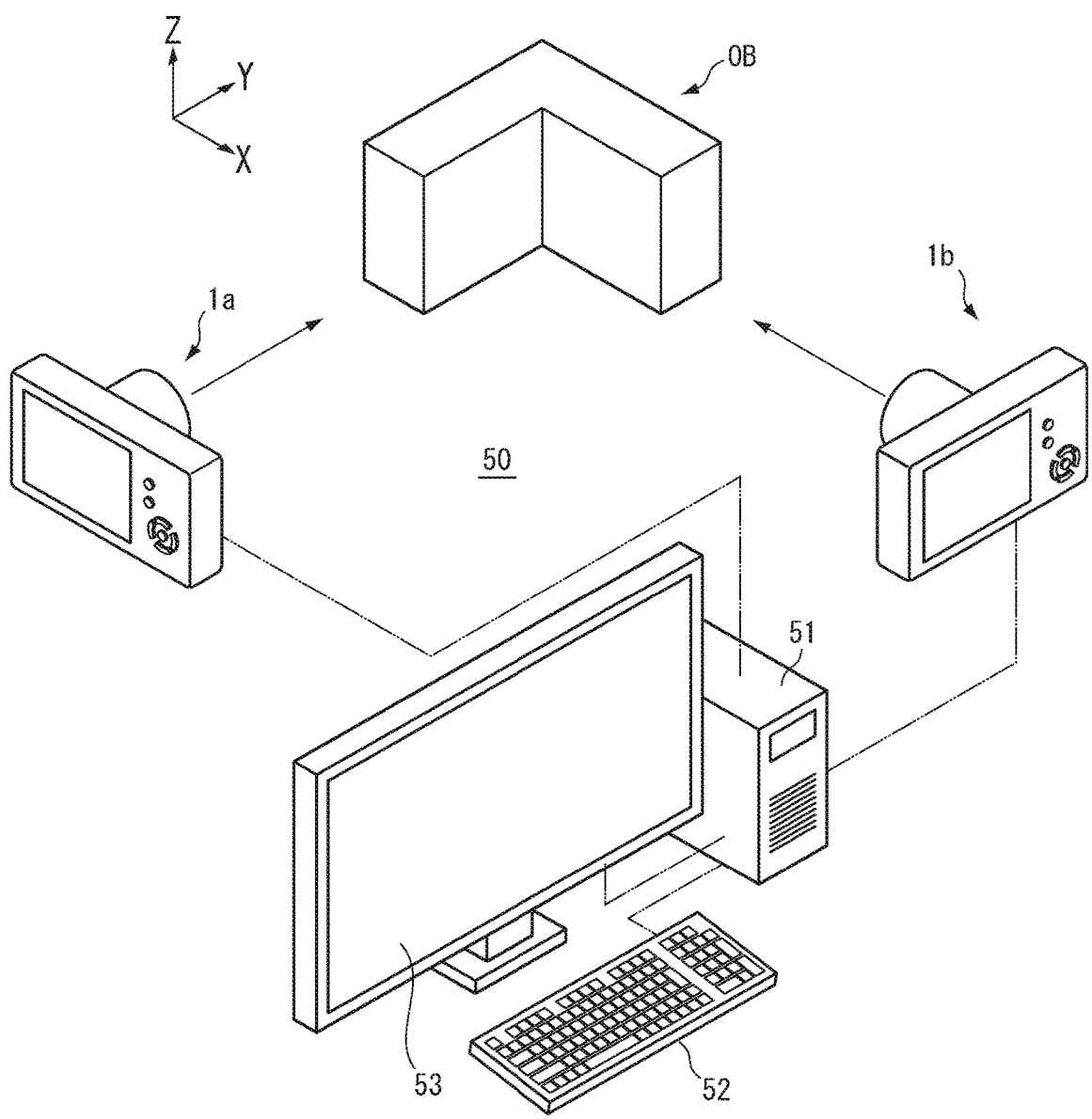
FIG. 15 is a diagram illustrating a detection system according to a fifth embodiment.

A fifth embodiment is described. In the fifth embodiment, the same configurations as in the above-mentioned embodiments are denoted by the same reference symbols, and descriptions thereof are omitted or simplified. FIG. 15 is a diagram illustrating an imaging system 50 to which the imaging device 1 according to the embodiment is applied. The imaging system 50 includes a plurality of imaging devices (a first imaging device 1a, a second imaging device 1b), and the information processing device that processes information output from the imaging devices. For example, as described above, the first imaging device 1a arranges unit data E in the first arrangement order to generate the object data Dc. For example, similarly to the above-mentioned embodiments, the second imaging device 1b arranges unit data E in a second arrangement order to generate the object data Dc. For example, the second arrangement order is the same as or different from the above-mentioned first arrangement order.

The information processing device 51 communicates with the first imaging device 1a to acquire information (for example, model information) from the first imaging device 1a. The information processing device 51 communicates with the second imaging device 1b to acquire information (for example, model information) from the second imaging device 1b. The information processing device 51 performs information processing by using the information acquired from the first imaging device 1a and the information acquired from the second imaging device 1b. For example, the first imaging device 1a and the second imaging device 1b each supply model information representing the object OB viewed from the viewpoint (one viewpoint, single viewpoint, one direction) of its own to the information processing device 51. The information processing device 51 performs model integration processing for integrating first model information representing the object OB viewed from the viewpoint of the first imaging device 1a and second model information representing the object viewed from the viewpoint of the second imaging device 1b.

Figure 16:
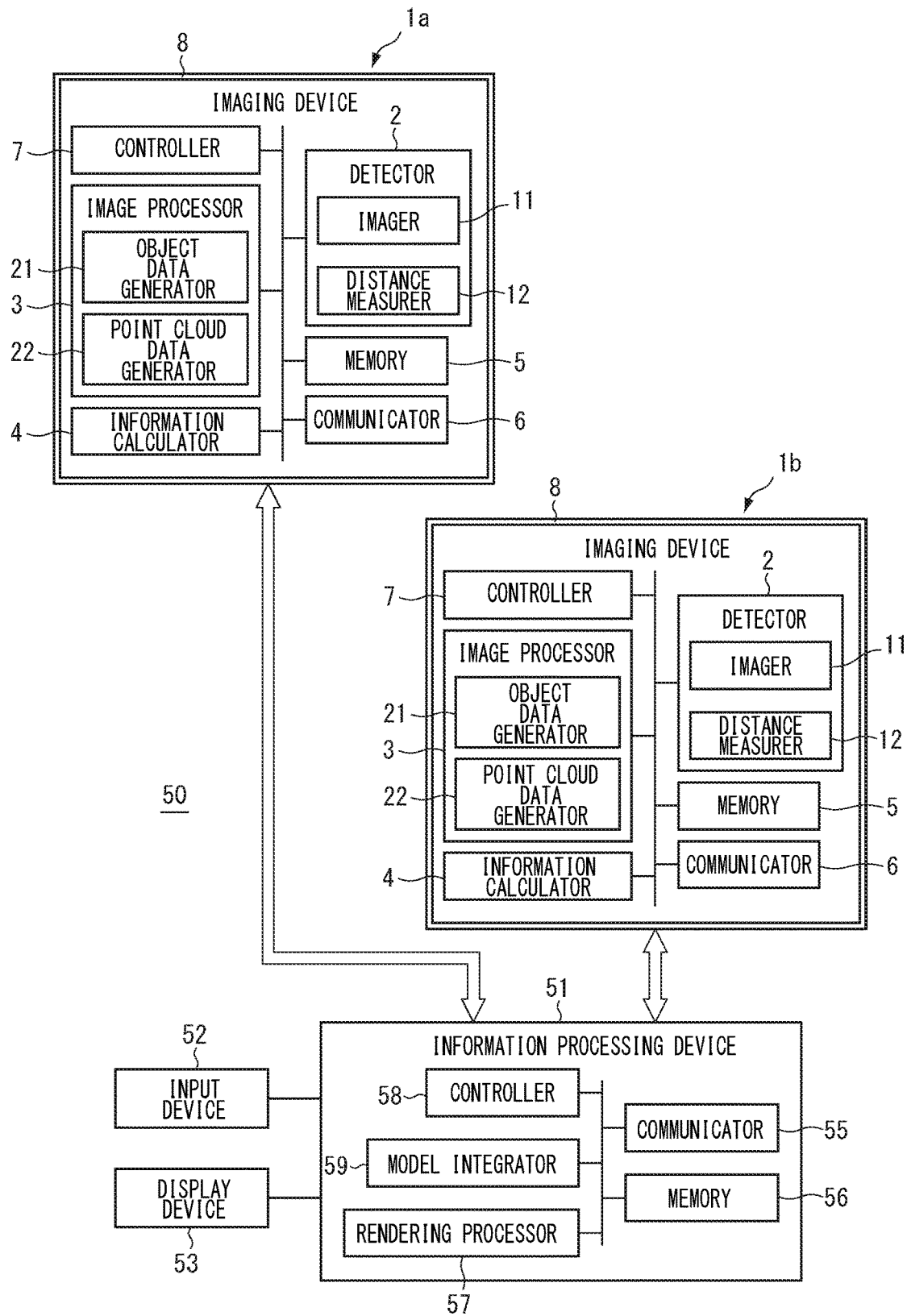
FIG. 16 is a diagram illustrating the detection system according to the fifth embodiment.

FIG. 16 is a block diagram illustrating the imaging system 50 according to the fifth embodiment. For example, the first imaging device 1a and the second imaging device 1b have the same configuration as that of the imaging device 1 illustrated in FIGS. 1A and 1B. The information processing device 51 includes a model integrator 59 that performs model integration processing. For example, the model integrator 59 extracts feature points from a shape represented by the first model information output from the first imaging device 1a. The model integrator 59 extracts feature points from a shape represented by the second model information output from the second imaging device 1b. The feature points are parts that are distinguishable from other parts in the shape represented by each model information. For example, a part defined as a surface in surface information is distinguishable from other surfaces based on the shape of the outer periphery of the part. For example, the model integrator 59 extracts feature points by using at least one of shape information and texture information included in each model information. For example, the model integrator 59 matches feature points between the first model information and the second model information to detect feature points common to the first model information and the second model information. The model integrator 59 uses the feature points common to the first model information and the second model information to calculate relative positions and relative postures of the shape represented by the first model information and the shape represented by the second model information and integrate the first model information and the second model information.

The method by which the model integrator 59 integrates the first model information and the second model information is not limited to the above-mentioned example. For example, the model integrator 59 may perform model integration processing by using relative positions and relative postures of the first imaging device 1a and the second imaging device 1b. The model integrator 59 may perform model integration processing by using relative positions of the viewpoint of the first imaging device 1a and the viewpoint of the second imaging device 1b and the relation between the direction (line of sight) of the viewpoint of the first imaging device 1a and the direction (line of sight) of the viewpoint of the second imaging device 1b. The information processing device 51 may include the model integrator 59 and is not necessarily required to include the rendering processor 57. For example, the information processing device 51 may output the result of model integration processing to an external device, and a rendering processor provided in the external device may execute rendering processing. The information processing device 51 may include a database that stores therein information output from the imaging device 1.

The technical scope of the present invention is not limited to the modes described in the above-mentioned embodiments and the like. At least one of the elements described in the above-mentioned embodiments and the like may be omitted. The elements described in the above-mentioned embodiments and the like may be combined as appropriate. To the extent allowed by laws, the disclosure of all the literature cited in the above-mentioned embodiments and the like is incorporated herein by reference.

DESCRIPTION OF REFERENCE SIGNS 1, 1a, 1b . . . imaging device, 2 . . . detector, 3 . . . image processor (image processing device), 4 . . . information calculator, 8 ... main body, 11 ... imager, 12 ... distance measurer, 21 ... object data generator, 22 ... point cloud data generator, 23 ... classifier, 24 ... mesh information generator, 25 ... texture information generator, E ... unit data, F ... point data, G ... group, H ... mesh element, K ... texture element, Dc ... object data, De ... point cloud data, Df ... mesh information, Dg ... texture information, M, M1, M2 ... mesh, OB ... object

What is claimed is:

1. An imaging device, comprising:
   an imager that images an object from a predetermined viewpoint;
   a distance measurer that measures distances from the predetermined viewpoint to points on the object;
   an object data generator that uses an image taken by the imager and measurement results of the distance measurer to sequentially arrange unit data including pairs each having a pixel value in the taken image and a distance from a point on the object corresponding to the pixel value to the predetermined viewpoint, while maintaining a first arrangement order that includes an arrangement order of pixel values in the taken image and a pixel reading order in the taken image, and generate object data; and
   a point cloud data generator that calculates positional information on points on the object based on the object data and sequentially arranges point data including the positional information in the first arrangement order to generate point cloud data.

2. The imaging device according to claim 1, wherein in the taken image, pixels corresponding to the unit data are arranged in the first arrangement order.

3. The imaging device according to claim 1, wherein the point data is read from the point cloud data by sequential access.

4. The imaging device according to claim 1, comprising a classifier that classifies the point data included in the point cloud data into a plurality of groups based on the positional information.

5. The imaging device according to claim 4, wherein the classifier classifies the groups into a plurality of hierarchies in accordance with the arrangement of the point data in the groups.

6. The imaging device according to claim 4, wherein the groups include a group to which the point data on successive pixels in the taken image belongs.

7. The imaging device according to claim 4, wherein the number of the point data belonging to a first group among the groups is different from the number of the point data belonging to a second group among the groups.

8. The imaging device according to claim 4, comprising a mesh information generator that generates mesh information by arranging, in the first arrangement order, mesh elements each including a pair of the point data and information on the group to which the point data belongs.

9. The imaging device according to claim 8, wherein the mesh elements are read by sequential access.

10. The imaging device according to claim 8, wherein the groups are classified into a plurality of hierarchies in accordance with the arrangement of the point data in the groups, and the mesh information includes setting information in which the arrangement of the point data corresponding to the hierarchies is defined.

11. The imaging device according to claim 10, wherein the groups are classified into a plurality of hierarchies in accordance with the arrangement of the point data, and the information on the group includes data representing a hierarchy of the group.

12. The imaging device according to claim 4, comprising a texture information generator that generates texture information by arranging, in the first arrangement order, texture elements each including a pair of the pixel value corresponding to the point data and information on the group to which the data belongs.

13. The imaging device according to claim 12, wherein the groups are classified into a plurality of hierarchies in accordance with the arrangement of the point data, and the texture information includes setting information in which the arrangement of the point data corresponding to the hierarchies is defined.

14. The imaging device according to claim 1, comprising an information calculator that uses one or both of the point cloud data and data generated based on the point cloud data to calculate at least one of shape information and texture information on the object.

15. The imaging device according to claim 1, comprising:
    a main body to house the imager, the distance measurer, and the object data generator therein; and
    a transmitter that transmits one or both of the point cloud data and data generated based on the point cloud data to outside of the main body.

16. An imaging system, comprising:
    the imaging device according to claim 1; and
    an information processing device that processes information output from the imaging device.

17. The imaging device according to claim 1, wherein each of data structures of the object data and the point cloud data is indexless.

18. An image processing device, comprising:
    an object data generator that uses an image of an object taken from a predetermined viewpoint and measurement results of distances from the predetermined viewpoint to points on the object to sequentially arrange unit data including pairs each having a pixel value in the taken image and a distance from a point on the object corresponding to the pixel value to the predetermined viewpoint, while maintaining a first arrangement order that includes an arrangement order of pixel values in the taken image and a pixel reading order in the taken image, and generate object data; and
    a point cloud data generator that calculates positional information on points on the object based on the object data and sequentially arranges point data including the positional information in the first arrangement order to generate point cloud data.

19. The image processing device according to claim 18, wherein each of data structures of the object data and the point cloud data is indexless.

20. A non-transitory tangible medium storing therein an image processing program for causing a computer to execute:
    generating object data by using an image of an object taken from a predetermined viewpoint and measurement results of distances from the predetermined viewpoint to points on the object and sequentially arranging unit data including pairs each having a pixel value in the taken image and a distance from a point on the object corresponding to the pixel value to the predetermined viewpoint while maintaining a first arrangement order that includes an arrangement order of pixel values in the taken image and a pixel reading order in the taken image, to generate the object data; and generating point cloud data by calculating positional information on points on the object based on the object data and sequentially arranging point data including the positional information in the first arrangement order.

21. The non-transitory tangible medium according to claim 20, wherein each of data structures of the object data and the point cloud data is indexless.

22. A non-transitory tangible medium storing therein a data structure generated by using an image of an object taken from a predetermined viewpoint and measurement results of distances from the predetermined viewpoint to points on the object to sequentially arrange unit data including pairs each having a pixel value in the taken image and a distance from a point on the object corresponding to the pixel value to the predetermined viewpoint, while maintaining a first arrangement order, the data structure comprising:
 setting information in which the first arrangement order that includes an arrangement order of pixel values in the taken image and a pixel reading order in the taken image is defined; and
 point data that includes positional information on points on the object calculated based on the object data and that is sequentially arranged in the first arrangement order.

23. The non-transitory tangible medium according to claim 22, wherein each of data structures of the object data and the point cloud data is indexless.

24. An imaging device, comprising:
 an imager that images an object from particular positions;
 a distance measurer that measures distances from the particular positions to the object;
 an object data generator that uses an image taken by the imager and measurement results of the distance measurer to sequentially arrange unit data including pairs each having a pixel value in the taken image and the distance corresponding to the pixel value, while maintaining a first arrangement order that includes an arrangement order of pixel values in the taken image and a pixel reading order in the taken image, and generate object data; and
 a point cloud data generator that sequentially arranges point data including positional information on points on the object based on the object data in the first arrangement order to generate point cloud data.

25. The imaging device according to claim 24, comprising a memory that stores the unit data therein based on the reading order.

26. The imaging device according to claim 24, wherein the point data is read from the point cloud data by sequential access.

27. An imaging system, comprising:
 the imaging device according to claim 24; and
 an information processing device that processes information output from the imaging device.

28. The imaging device according to claim 24, wherein each of data structures of the object data and the point cloud data is indexless.

29. An imaging system, comprising:
 a first imager that images an object from a particular position;
 a first distance measurer that measures a distance from the particular position to the object;
 a first object data generator that uses an image taken by the first imager and a measurement result of the first distance measurer to sequentially arrange unit data including pairs each having a pixel value in the image taken by the first imager and the distance corresponding to the pixel value in the image taken by the first imager, while maintaining a first arrangement order that includes an arrangement order of the pixel values in the image taken by the first imager and a pixel reading order in the image taken by the first imager, and generate first object data;
 a first point cloud data generator that sequentially arranges point data including positional information on points on the object based on the first object data in the first arrangement order to generate first point cloud data;
 a second imager that images the object from a position different from the particular position;
 a second object data generator that sequentially arranges unit data including pairs each having an image taken by the second imager and a distance from the different position to the object, while maintaining a second arrangement order that includes an arrangement order of the pixel values in the image taken by the second imager and a pixel reading order in the image taken by the second imager, and generate second object data;
 a second point cloud data generator that sequentially arranges point data including positional information on points on the object based on the second object data in the second arrangement order to generate second point cloud data; and
 a model integrator that integrates first model information based on the first point cloud data and second model information based on the second point cloud data.

30. The imaging system according to claim 29, wherein each of data structures of the first object data, the first point cloud data, the second object data, and the second point cloud data is indexless.

* * * * *